(12) United States Patent
Tierney et al.

(10) Patent No.: US 12,204,544 B2
(45) Date of Patent: *Jan. 21, 2025

(54) METHOD AND SYSTEM FOR PROCESSING LARGE AMOUNTS OF REAL WORLD EVIDENCE

(71) Applicant: RegenMed, Inc., Greenwich, CT (US)

(72) Inventors: Nicolas R. Tierney, Chatham Township, CT (US); Michael P. Tierney, Greenwich, CT (US); Svetlana Chuikova, Kopishhe (BY)

(73) Assignee: RegenMed, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,231

(22) Filed: Jun. 19, 2023

(65) Prior Publication Data
US 2023/0350897 A1    Nov. 2, 2023

Related U.S. Application Data

(63) Continuation of application No. 17/386,421, filed on Jul. 27, 2021, now Pat. No. 11,720,567.

(60) Provisional application No. 63/057,124, filed on Jul. 27, 2020.

(51) Int. Cl.
    *G06F 16/00*     (2019.01)
    *G06F 16/2455*   (2019.01)
    *G06F 16/28*     (2019.01)

(52) U.S. Cl.
    CPC ........ *G06F 16/2455* (2019.01); *G06F 16/284* (2019.01)

(58) Field of Classification Search
    CPC . G06F 16/2455; G06F 16/284; G06F 16/3329
    See application file for complete search history.

(56) References Cited

U.S. PATENT DOCUMENTS 9,582,757 B1 * 2/2017 Holmes .............. G06F 16/24522
2020/0279629 A1 * 9/2020 Morrissey .............. G16H 10/60

* cited by examiner

*Primary Examiner* — Debbie M Le
(74) *Attorney, Agent, or Firm* — Leason Ellis LLP

(57) ABSTRACT

A computer-based real-world evidence (CRWE) solution that can handle disparities in real-world data (RWD) that might otherwise not be combinable or that might originate from disparate or heterogeneous sources. The CRWE solution is designed such that it can build up RWD data from the ground up (for example, from the atomic level) into a canonical relational database by converting or linking the raw RWD data to its canonical versions such that reliable canonical answers can be mined from large datasets and consistently provided in response to queries to the solution for an answer. The CRWE solution is designed to gather and analyze large amounts of RWD data from heterogeneous, multi-national, and unverifiable data sources, and provide canonical results that are constituently reliable and can expose, for example, clinically-significant correlations between medical products or treatments and outcomes.

20 Claims, 23 Drawing Sheets

Patient Portal
Patient Nicolas Tierney
Protocol jointrep focal chondral defects of the knee protocol My results Pain  Koos symtomps+  Koos function,  Koos function, sports and  Koss quality  Koss total  BMI  Tegner
      stiffness       daily living    recreational activities    of life                      activity
                                                                                              scale Survey score Chart key
o Your results
[About graph ⌄]

100
50
0
Pre  24m  12m  6m  3m
Time

Treatment
No information available yet. Please proceed in completing your surveys.

FIG. 8 demo-patient.incytesapp.co/survey/241/23/64/22 — 902 inCytes

Knee history

The following questions are regarding when your symptoms began, prior knee treatments, and your current limitations regarding your knee symptoms Earliest presentation of symptoms?

[         ]

Prior knee treatments received?
▫ PRP
▫ Steroids
▫ Arthroscopy
▫ None
▫ Hyaluronic Acid
▫ Prolotherapy
▫ Other/Not sure VAS pain score The following question is regarding you current pain level.

Choose a number from 0 to 10 that best describes your pain.

0- No pain 5- Distressing pain 10- Unbearable pain
○ 0
○ 1
○ 2
○ 3
○ 4

Koos, JR

This survey asks for your opinion about your knee and helps us understand how well you are able to complete your usual activities. Answer each question by choosing only ONE response to each question, please give the best answer you can.

Stiffness

The following question concerns the amount of joint stiffness you have experienced during the last week in your knee. Stiffness is a sensation of restriction or slowness in the ease with which you move your knee joint.

| Treatment | Prior knee treatments received? | |
|---|---|---|
| ○ RMSNY Knee OA PRP Clinical Survey Delegate: Clinician Due: Now | ▫ PRP ▫ Steroids ▫ Arthroscopy ▫ None | ▫ Hyaluronic Acid ▫ Prolotherapy ▫ Other/Not sure |

Post-Treatment

○ RMSNY PRP Characterization Survey
Delegate: Clinician
Due: Now

○ RMSNY PRP Outcomes follow Up survey
Delegate: Patient
Due: 2 Months

○ RMSNY PRP Outcomes follow Up survey
Delegate: Patient
Due: 6 Months

○ RMSNY PRP Outcomes follow Up survey
Delegate: Patient
Due: 12 Months

VAS pain score

The following question is regarding you current pain level.

Choose a number from 0 to 10 that best describes your pain.

0- No pain 5- Distressing pain 10- Unbearable pain

○ 0
○ 1
○ 2
○ 3
○ 4
○ 5
○ 6
○ 7
○ 8
○ 9
○ 10

Koos, JR

This survey asks for your opinion about your knee and helps us understand how well you are able to complete your usual activities. Answer each question by choosing only ONE response to each question, please give the best answer you can.

Stiffness

The following question concerns the amount of joint stiffness you have experienced during the last week in your knee. Stiffness is a sensation of restriction or slowness in the ease with which you move your knee joint.

How severe is your knee joint stiffness after first wakening in the morning?

○ None
○ Mild

inCytes

○ Search
○ New case

Dashboard
Cases
Reports
Circles
Patients
Support

○ Account
○ Profile
○ Logout

Welcome to incytes!

[Buy cases]

My Tasks — 1104

| Case | Survey | Due date | Delegate |
|---|---|---|---|
| ⊙ Nicolas Tierney RMSNY Knee OA PRP | RMSNY Knee OA PRP clinical survey Post-Treatment | 7/23/2020 ●Overdue | Nicolas Tierney Clinician |
| ⊙ Nicolas Tierney RMSNY Knee OA PRP | RMSNY PRP Characterization survey Post-Treatment | 7/23/2020 ●Overdue | Nicolas Tierney Clinician |
| ⊙ Nicolas Tierney Jointrep focal chondral defects of the knee protocol | Jointrep focal chondral defects of the knee patient diagnostic survey | 7/23/2020 ●Recently completed | Nicolas Tierney Clinician |

My Alerts

| Source | Type | Alert date |
|---|---|---|
| ⊙ Nicolas Tierney nrtierney+153@gmail.com | Outlier detected BMI \| Upper limit > 30 | 7/21/2020 |
| ⊙ nrtierney+110@gmail.com | Outlier detected Tegner \| Upper limit > 9 | 7/15/2020 |
| ⊙ Nicolas Tierney nrtierney+109@gmail.com | Outlier detected BMI \| Upper limit > 30 | 7/15/2020 |

32 Open cases  39 Total patients  40 Total cases  8 Close cases

◀ BACK TO CIRCLE OVERVIEW
RMSNY Knee OA PRP Circle
🔒 Non-PHI

Circle Description
Ready to describe your Circle? Click the EDIT button the get started.

Circle Information
Nicolas Tierney, Head of Product
ntierney@gmail.com
FOUNDER
Nicolas Tierney, Head of Product
ntierney@gmail.com
ADMINISTRATOR

BAW
100
50
0
*****
***

Chart key
MY PATIENTS
ALL CIRCLE PATIENTS
ABOUT TH... ^

Observational Protocol
RMSNY Knee OA PRP
VIEW PROTOCOL

| Circle Statistics | Current Activity | 10<br>Total Current Users | | 25<br>Total Shared Cases |
| --- | --- | --- | --- | --- |
| | Available Allocations | 4<br>Available Subscription Credits | | 75<br>Available Cases |
| | Founded | 7/23/2020 | | |

Circle Members

FIG. 12

Report Builder

Circles
RMSNY Hip

Cohort

ADD  EDIT  SETTINGS

PRP LEUKOCYTE COUNT?

PRP leukocyte count?

Less than ▾

Less than
0.1

UPDATE

DELETE

DONE

8 COHORT A Cases    1 COHORT B Cases    7 COHORT C Cases

Bundle Content

SF-36 Questionnaire
Please answer the 36 questions of the Health Survey completely, honestly, and without interruptions.

Tag
SF-36 General health Q1

Question
In general, would you say your health is:

Instructions

Is Optional ☐
Possible Answers — 1506

Answer
Excellent                    Score 100

Answer
Very Good                    Score 75

Answer
Good                         Score 50

Answer
Fair                         Score 25

Answer
Poor                         Score 0

ADD ANOTHER ANSWER

DISCARD    SAVE 1502
1504

◀ BACK TO SCORING GROUP OVERVIEW
Formula   Details
SF-36 Emotional well-being

Formula Builder ((☐SF-36 Emotional well-being Q24)+(☐SF-36 Emotional well-being Q25)+(☐SF-36 Emotional well-being Q26)+
(☐SF-36 Emotional well-being Q28)+(☐SF-36 Emotional well-being Q30))/5

Limits
| Lower | Upper |
|---|---|
| 0 | 100 |

| C | ( | ) | ⌫ |
|---|---|---|---|
| 7 | 8 | 9 | / |
| 4 | 5 | 6 | X |
| 1 | 2 | 3 | - |
| 0 | . |   | + |

Fences
| Lower | Upper |
|---|---|

Save

Search by Title or Tag 🔍                    ADD ⊕

⊙ SF-36 QUESTIONNAIRE
☐ SF-36 General health Q34
   I am as healthy as anybody I know.                    ADD ⊕
☐ SF-36 Role limitations due to emotional problems Q18
   Accomplished less than you would like.                ADD ⊕
☐ SF-36 Role limitations due to physical health Q14
   Accomplished less than you would like.                ADD ⊕
☐ SF-36 Physical functioning Q12
   Bathing or dressing yourself.                         ADD ⊕
☐ SF-36 Physical functioning Q8
   Bending, kneeling, or stooping.                       ADD ⊕
☐ SF-36 Physical functioning Q7
   Climbing one flight of stairs.                        ADD ⊕
☐ SF-36 Physical functioning Q6                          ADD ⊕

METHOD AND SYSTEM FOR PROCESSING LARGE AMOUNTS OF REAL WORLD EVIDENCE

CROSS-REFERENCE TO RELATED APPLICATION

This application is a continuation of, and claims priority from, U.S. patent application Ser. No. 17/386,421, titled METHOD AND SYSTEM FOR PROCESSING LARGE AMOUNTS OF REAL WORLD EVIDENCE, filed on Jul. 27, 2021 and patented Aug. 8, 2023 as U.S. Pat. No. 11,720,567, which claims benefit of U.S. Provisional Patent App. No. 63/057,124, titled METHOD AND SYSTEM FOR PROCESSING LARGE AMOUNTS OF REAL WORLD EVIDENCE, filed on Jul. 27, 2020, each of which are hereby incorporated by reference herein in their respective entireties.

FIELD OF THE DISCLOSURE

The present disclosure relates to a method, a system and a computer program for building or implementing a relational database containing large datasets of disparate, heterogeneous, or non-combinable real-world data to provide consistently reliable canonical results to plain language queries.

SUMMARY OF THE DISCLOSURE

This disclosure provides a computer-based real-world evidence (CRWE) solution that can handle disparities in real-world data (RWD) that might otherwise not be combinable or that might originate from disparate or heterogeneous sources. The CRWE solution is designed such that it can build up RWD data from the ground up in a relational database by converting or linking the raw RWD, for example, at its atomic level, to its canonical versions such that reliable answers can be mined from large datasets and consistently provided in response to queries to the solution. The CRWE solution is designed to gather and analyze large amounts of RWD data from heterogeneous, multi-national, and unverifiable data sources, and provide canonical results that are constituently reliable and can expose, for example, correlations between medical products or treatments and outcomes.

Most healthcare "big data" is unverifiable, and therefore inherently suspect. An important distinguishing feature of the instant solution is the verifiability of the data, which verifiability is critical in applications such as healthcare to the reliability of the derived correlations. The solution's data can be verified through time stamping, identity of person entering, specific query/survey/observational protocol and therefore context.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in, and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 8 depicts a non-limiting example of a patient portal graphic user interface (GUI) that can be rendered in accordance with one embodiment of the present invention;

FIG. 9 depicts a non-limiting example of a patient surveys GUI that can be rendered in accordance with one embodiment of the present invention;

FIG. 11 depicts a non-limiting example of a dashboard GUI that can be rendered in accordance with one embodiment of the present invention;

FIG. 12 depicts a non-limiting example of a circle detail GUI that can be rendered in accordance with one embodiment of the present invention;

FIG. 14 depicts a non-limiting example of a cohort builder GUI that can be rendered in accordance with one embodiment of the present invention;

FIG. 15 depicts a non-limiting example of a canonical question construction GUI that can be rendered in accordance with one embodiment of the present invention;

FIG. 16 depicts a non-limiting example of a formula builder GUI that can be rendered in accordance with one embodiment of the present invention;

Figure 1:
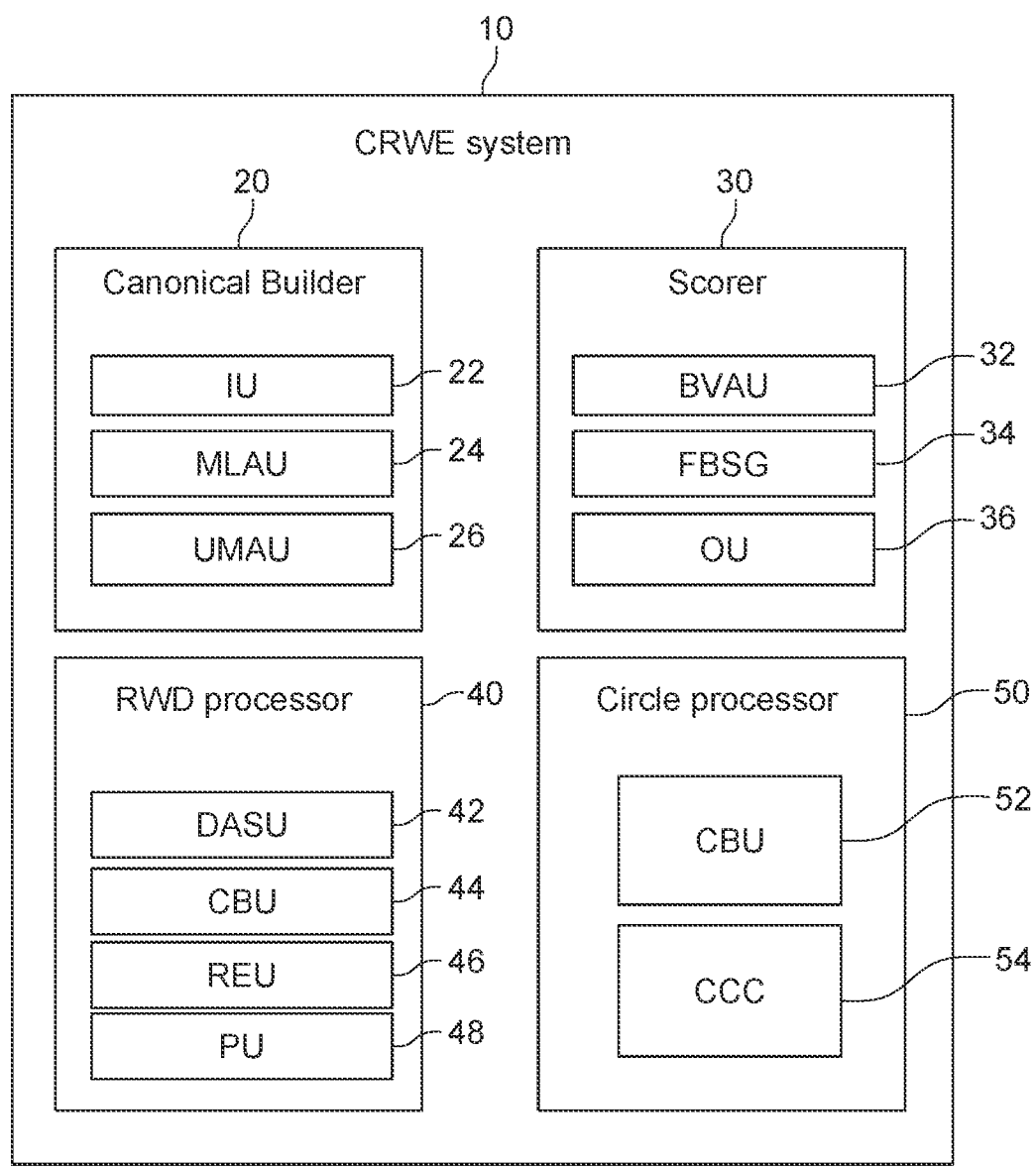
FIG. 1 depicts a non-limiting embodiment of a computer-based real-world evidence (CRWE) system, constructed according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Both the United States Food and Drug Administration (FDA) and European Medicines Agency (EMA) have recognized real-world data (RWD) and real-world evidence (RWE) as important sources of truth in determining safety and efficacy across a wide range of therapeutics in healthcare. This comes amidst the growing costs, and therefore inherent bias, associated with clinical trials, as well the increasing connectivity and accessibility of patients and their data around the world. RWD and RWE are playing an increasing role in health care decisions.

Another important market driver is the length of time between the commencement of a clinical trial and its conclusion. During this typically multi-year process, many patients are denied treatments and/or medications which can be shown to be both safe and efficacious in a much shorter time period, and for a substantially reduced cost, and with applicability to a broader population.

RWD is generally defined as data relating to patient health status and/or the delivery of health care routinely collected from a variety of sources. RWD can come from a number of sources, such as, for example, electronic health records (EHRs), claims and billing activities, product and disease registries, patient-generated data including in home-use settings, bio-sensors, laboratory analyses, genetic and other "omics" screening, and data gathered from other sources that can inform on health status, such as mobile devices.

RWE is generally defined as clinical evidence regarding the usage and potential benefits or risks of a medical product or treatment derived from analysis of RWD, including, for example, EHRs, medical claims or billing activities databases, registries, patient-generated data, mobile devices, etc. RWE can be generated by different study designs or analyses, including but not limited to, randomized trials, including large simple trials, pragmatic trials, and observational studies (prospective and/or retrospective).

In medicine, RWE typically means evidence obtained from RWD, which include observational data obtained outside the context of randomized controlled trials (RCTs) and generated during routine clinical practice. RWE is frequently used to assess patient outcomes, to ensure that patients get treatment that is right for them and to develop evidence-based standards of care for medications, treatment modalities, and other healthcare interventions and recommendations.

RWE can be important when clinical trials cannot really account for the entire or meaningful portion of a patient population with respect to a particular disease. Patients suffering from, for example, comorbidities or belonging to a distant geographic region or age limit who did not participate in any clinical trial, or whose characteristics were otherwise excluded from the parameters of the clinical trial, may not respond to the treatment in question or may respond adversely. RWE provides answers to these problems and also supports the analysis of safety and efficacy of medications and treatments over a longer and therefore more statistically significant period of time. In other words, RWE helps eliminate the "placebo" effect which often skews the results of clinical trials. Pharmaceutical companies, device manufacturers, and health insurance payers study RWE to understand patient pathways to deliver appropriate care for appropriate individuals and to minimize their own financial risk by investing in treatments and drugs that work for patients.

The use of computers, mobile devices, wearables and other biosensors to gather and store huge amounts of health-related data has been rapidly accelerating. The resulting data, properly structured and queries, hold potential to allow users to better design and conduct clinical trials and studies in the health care setting to answer questions previously thought infeasible. In addition, with the development of sophisticated, new analytical systems, it has become possible to better analyze these data and apply the results of analyses to medical product development and approval. While such systems have greatly benefitted from innovations in artificial intelligence (AI), data crawling mechanisms and computing capacity for huge amounts of data, they have not been able to adequately deal with the challenges associated with large amounts of different data being collected on different systems.

For instance, a question or query such as "how many milliliters" of a certain type of cell " . . . per gram of a patient's blood sample?" does not result in a reliable answer when using, for example, a robust machine-learning algorithm with high performance computing (HPC). Because of the thousands or millions of ways that this question might be answered at the original source (for example, a physician or a nurse in the United States, or a physician or nurse in Moldova), including various languages that might be used in the answers, even the most robust machine learning algorithms might not be able to provide a reliable answer for large datasets that include such disparate sources of data.

Therefore, an urgent unmet need exists for a computer-based healthcare solution that can handle disparities in the original source data, or data that is non-combinable, unverifiable or, in many instances, not the correct data. This disclosure provides a computer-based real-world evidence (CRWE) solution that meets those needs and others, as will be apparent to those skilled in the art after reading this specification. The CRWE solution is designed to gather and analyze large amounts of data from heterogeneous, multi-national, and unverifiable data sources, and provide normalized results that can expose, for example, correlations between medical products or treatments and outcomes. The CRWE solution includes a computer-based real-world evidence (CRWE) system that can build up data from the ground up in a way that allows a user to get an answer from large sets of data that are clearly reliable.

FIG. 1 depicts a non-limiting embodiment of the CRWE system 10, constructed according to the principles of the disclosure. The CRWE system 10 can include a canonical builder 20, a scorer 30, a real-world data (RWD) processor 40 and/or a circle processor 50, any of which can include one or more computing devices and/or computer resources.

The canonical builder 20 can be arranged to capture RWD data from disparate or heterogeneous sources, which might not be otherwise combinable. The canonical builder 20 can include or interact with a relational database (for example, DB 120E, shown in FIG. 2), such as, for example, an SQL database. The database can contain questions that are designed to be canonical or standardized in use by the largest number of users, regardless of variables such as, for example, language, system type, or medical specialty. The database can also contain answers to canonical questions that are comparable and aggregable, allowing for efficiencies in computing and analyses. This reduces a common healthcare problem of data inequality, or the need for "Big Data" algorithms to make sense of disparate data sources across electronic medical record (EMR) systems. The canonical builder 20 can include an integrity unit (IU) 22, a multi-lingual adaptation unit (MLAU) 24, and/or a unit of measurement adaptation unit (UMAU) 26 to support and provide question canonicity.

Figure 2:
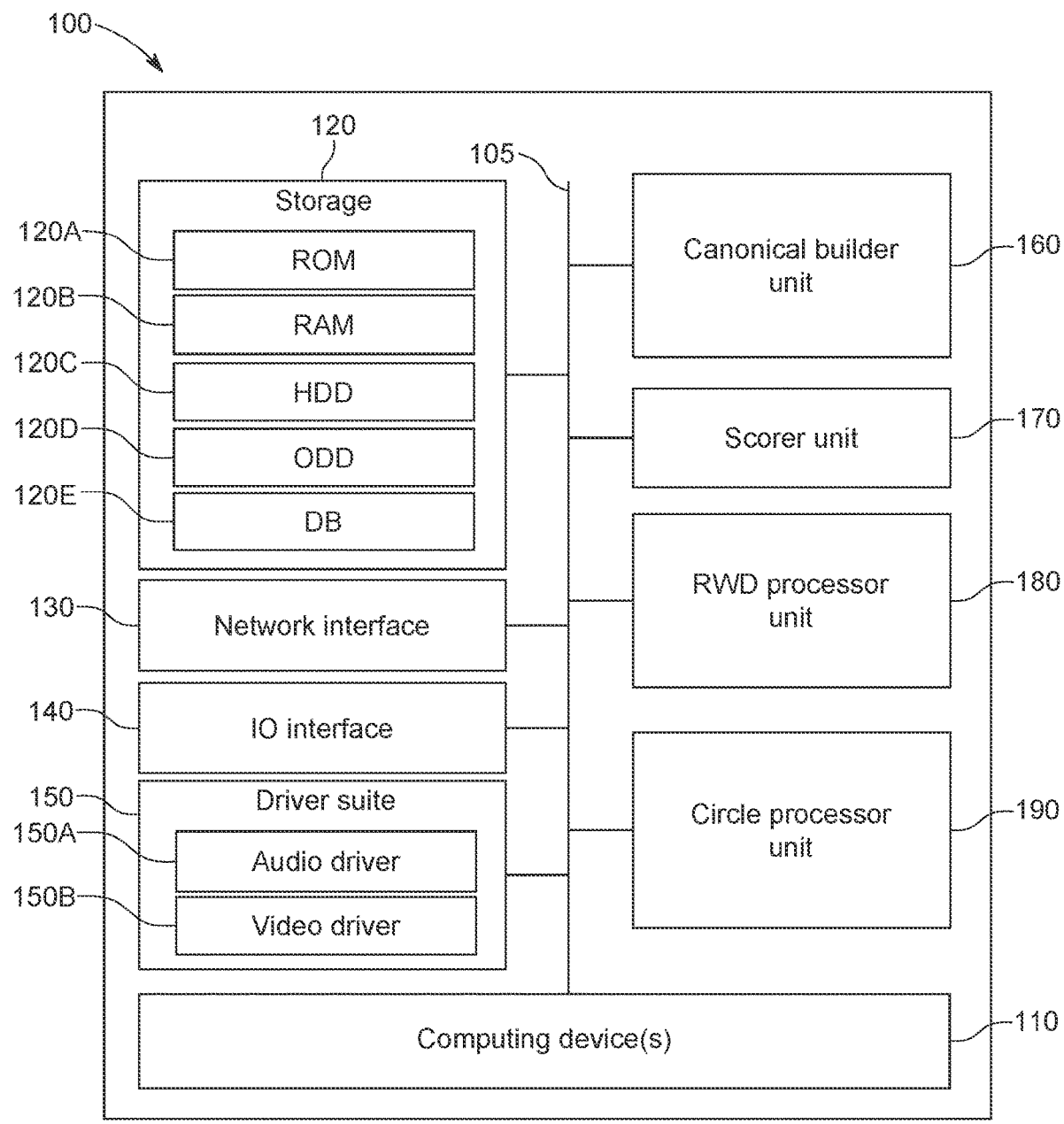
FIG. 2 shows another non-limiting embodiment of a CRWE system, constructed according to the principles of the disclosure.
Figure 3:
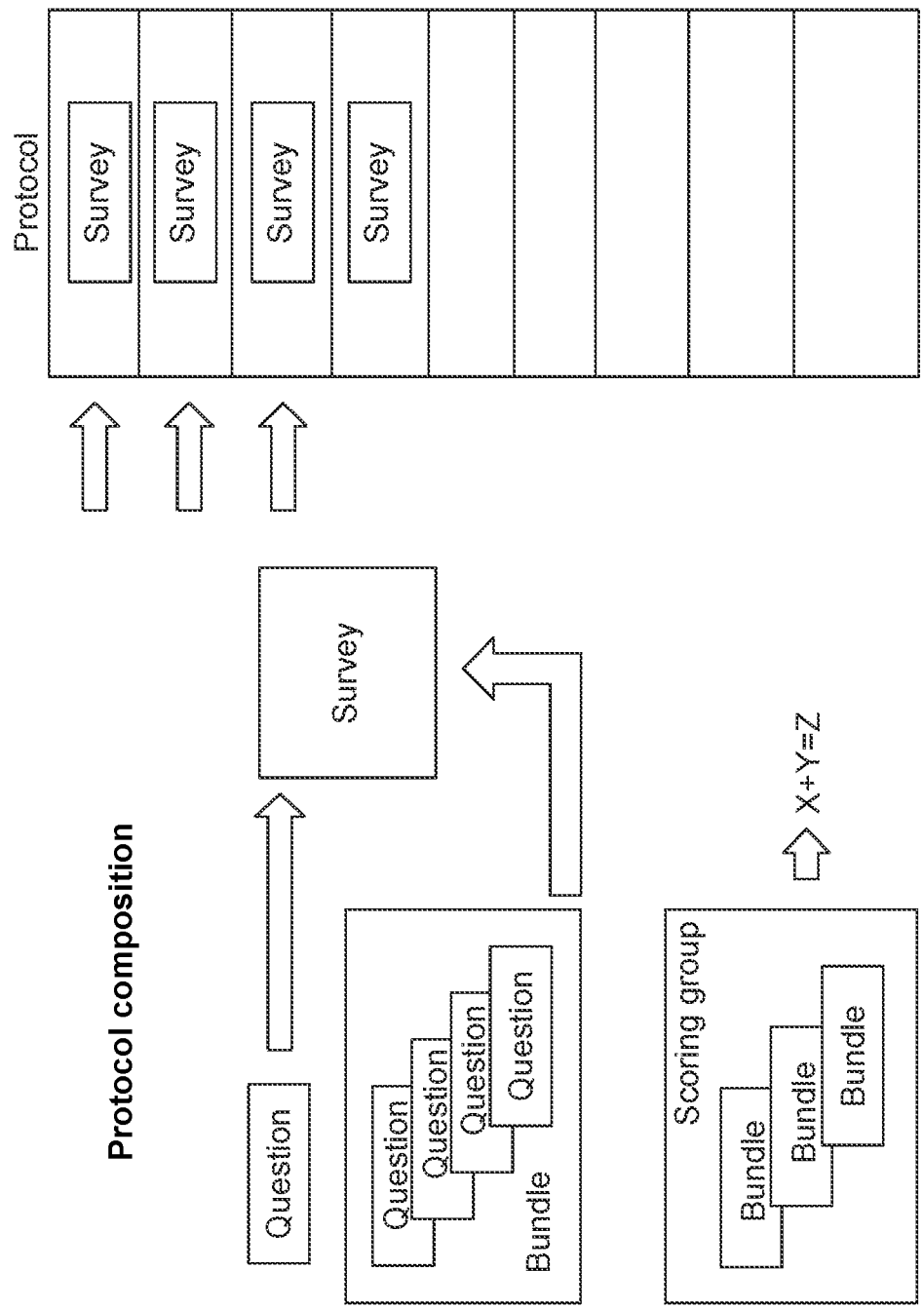
FIG. 3 depicts a non-limiting example of a protocol composition process that can be carried out in accordance with one embodiment of the present invention.

FIG. 3 shows a non-limiting example of a protocol composition that can be carried out by the CRWE system 10 (or system 100, shown in FIG. 2), including the canonical builder 20 and/or scorer 30. As seen in FIG. 3, a "protocol" (or "canonical protocol") can include one or more surveys, each of which in turn can include one or more questions. A protocol can allow the CRWE system 10 (or 100) to take a canonical question and compare it against large datasets of canonical answers to reliably identify a correct answer to the question.

The IU 22 can include a self-referencing question table to provide data integrity and support the concept of canonical questions. The self-referencing question table includes a plurality of rows wherein one row points to another row in the table, which in turn points to a further row in the same table, thereby allowing for construction of a logical tree structure. Hence, a question such as "what was the gender of the patient?" can root to a canonical answer row in the table that contains "male" or "female" gender. Moreover, the question can root to a canonical root version of the question—for example, "gender of patient?" which in turn can root to the canonical answers. The IU 22 might need canonical versions of both the questions and answers to operate properly.

The rows in the self-referencing question table can contain a unique identification (ID) for each root question and a companion canonical question identification (ID) for any derivative. This allows the canonical builder 20 to derive the lineage of a question. Each type of question can be separated into its own respective table given that each is unique in its characteristics. The IU 22 can include a protection mechanism such that once a question has been answered anywhere in the system it is then locked from all future edits. The IU 22 can include a mechanism to modify questions through creation of a child based on the root question. An example of this can be seen in the simple question of gender. If you wish to run a report and discriminate the results based on gender of male, it does not matter in the form that it was presented (non-binary inclusive) since male was the canonical answer for the question. This allows for the sample size to remain the same since for all derivate gender questions, "male" was presented as an option.

A non-limiting example of a use case of the IU 22 can be in regenerative medicine, which relates to the use of a patient's own cells as the regenerative, reparative and/or immunomodulatory product to be used in treating the patient. In this instance, the global scientific community has generally agreed that the regenerative product should be sampled and each cell composition in the product counted and otherwise characterized. The outcome, however, of reintroducing the regenerative product into the patient to treat a particular condition can vary drastically from patient to patient, varying with respect to factors such as, for example, cell counts, cell compositions, the age, gender, race, geographic location, socio-economic status, etc., of the patient. The IU22 can address such disparities in the data by presenting questions that are determined to be relevant to the outcome in their canonical form, and the answers in their canonical forms.

The MLAU 24 can include a computer resource that, through the use of the automatic browser language detection, can present the questions and the answers to patients via a communicating device in the language that they prefer. These multi-lingual questions and answers can all be based on the root question given in English. The values attributed to the answer for a question can be rendered non-modifiable in the translated presentation providing data integrity across the languages for a single question.

The MLAU 24 can be arranged to operate as a filter that can receive a question in any language (for example, Spanish) and convert the question to its canonical version in the English language. The MLAU 24 can also function to convert the canonical English language answer to the language in which the query was received, which in this example is Spanish.

The UMAU 26 can include a computer resource arranged to store all numeric answers in the system using a metric system. Based on automatic browser detection, the UMAU 26 can present the unit of measure that is appropriate for the culture associated with the user. Storing the data in the metric system allows for the normalization of the data and when reporting analysis complexity of unit conversion is removed.

The scorer 30 can be arranged to receive and convert answers to canonical questions into a score. The scorer 30 can receive and convers answers that come in a variety of formats, including, for example, Text, Date, Number, or Upload, which can be converted by the scorer 30 into a value, and when aggregated, into a score. Such scores may be used, for example, to measure patient reported outcomes measurements (PROMS), and provide a quantifiable and standardized measurement by which to aggregate patient responses. The scorer 30 can include a bundles/value attribution unit (BVAU) 32, a formula builder/scoring grouper (FBSG) 34 and/or an outlier unit (OU) 36. The scorer 30 can be arranged to allow for the flexible construction of any known PROMS, or the creation of new scoring systems. The scorer 30 can be arranged to generate outlier alerts to help attract attention to scores outside of acceptable ranges.

The BVAU 32 can be arranged to group questions together to allow for their collective answers to be used in a formula. These question answers can be tagged by the BVAU 32 with a unique value within the system to simplify the retrieval of their values.

The FBSG 34 can be arranged create or manage scoring groups, which can function as a container for the generation of a formula to be applied to a series of questions. These questions can be housed in bundles maintained by FBSG 34. A bundle can include a series of questions and a tag that can be used by, for example, the scorer 30 in determining a score value for the bundle. These questions can be retrieved by the FBSG 34 using their tagged value and used by the FBSG 34 to create a formula to be applied to a completed survey. These formulas can be generated from more than one bundle at a time. Once a survey has been completed, the FBSG 34 is arranged to be able to search across the formulas that are available based on the questions contained in the survey and accumulate the results. These results can be later used for reporting and tracking. The application of a formula by FBSG 34 can be dynamic and does not require users to designate them to a particular survey. With this functionality, formulas created by the FBSG 34, after the survey has been completed, can be applied to surveys at a later time.

The OU 36 can be arranged to generate or configure fences through, for example, the scoring group functions. The OU 36 can be arranged to, based on a score value or range of score values, automatically compare or correlate consistent canonical answers to a particular canonical question and identify outliers. The OU 36 can be implemented with a machine-learning platform, such as, for example, a neural network. The OU 36 can look at the historical questions that had the most value and update parametric values such that the more critical canonical questions are weighted.

In the OU 36, the fences can be constructed to allow for a user to define when an answer has exited an acceptable range and further action can be taken. The fences can be construed by, for example, the neural network. The OU 36 can be arranged to generate or trigger a notification, such as, for example, when a failure to meet a gate occurs, and send a (custom) notification to a clinician detailing which formula was applied and the value and fence that were breached. The OU 36 can be arranged to automatically detect a fence and, based on the analysis of the data, determine what is a "normal" range of values.

The RWD processor 40 can be arranged to process large amounts of answers regularly in order to provide the user with immediate visual representations of their data. To provide maximum value, the RWD process 40 can aggregate data from a large number of cases and a large number of users, standardizing the data through the use of shared canonical queries. The RWD processor 40 can be arranged to update the data live or in real-time with the most recent results from any contributing party. The RWD processor 40 can include a data accessibility and storage unit (DASU) 42, a cohort building unit (CBU) 44, a raw export unit (REU) 46 and/or a predictor unit (PU) 48.

The DASU 42 can be arranged to store and manage questions by type in their own tables based on their unique characteristics. The DASU 42 can include a computer resources to handle data storage and data calls.

The CBU 44 can be arranged to build cohorts or combinations of questions or values. The CBU 44 can build a filtered view on the data based on the cohorts. The filters can be built by the CBU 44 as a dynamic list of questions/answers from which surveys can be selected that have a particular survey question answered in the selected way. The questions can include, for example, at least two types of questions—for example, number or multiple choice. The CBU 44 can be arranged to filter each question based on one or more operators, such as, for example, "equals", "greater than", "greater than or equal to", "less than", "less than or equal to", "starts with", "ends with", or "contains". The CBU 44 can build the filters dynamically into, for example, or using T-SQL code to be executed on the database. This filters down to the cases that are to be used as part of the population. Once filtered, those cases can then be fed by the CBU 44 to a query which culls the graph data. This data can be split between the data for the entire population and the subset of the data for which the user is responsible for (their patients).

The REU 46 can be arranged to compile the data into, for example, .xslx format and export the data as raw data. The REU 46 can export of case data (for example, all surveys and metadata) in row-wise format. The data can be stored in the database in, for example, column-wise format, which can create a challenge to transpose the question data to the row. On top of that, there might be additional data that must be placed in precise columns. To facilitate that organization, the REU 46 can include coding that allows for the data to be compiled column-wise with the order encoded and then pivot to place the data into its final position in the row. This process, however, might take longer than the report since it can generate many more rows than it does when it is column wise.

The PU 48 can include a neural network or other machine learning computing resource. The PU 48 can be arranged to, with enough data, predict what is a normal boundary for a medical treatment path. This can then be further analyzed by the PU 48 to determine which are leading factors to a treatment's efficacy. The PU 48 can isolate those factors and apply them to other treatments to make predications on their success rates. In all, the PU 48 can provide predictions that can allow clinicians to assess whether a patient is a "good" candidate for one treatment over another. The PU 48 can also perform historical comparison to provide insights into new treatments or procedures. The dataset and machine-learning (or neural network) model can be enriched with data from consumer device information and from data supplied from various sources, for example, in the medical device industry, pharma, or non-traditional medicinal practices.

The circle processor 50 can be arranged to build circles based on shared protocols of canonical queries to ensure substantive comparisons. The circles can be managed, by the circle processor 50, through a set of configurable roles and permissions to which every user abides. Each circle can allow users to determine what and with whom they would like to share, compare aggregate or co-analyze data sources. The circle processor 50 can include a circle behavior unit (CBU) 52 and/or a cross-circle comparator (CCC) 54.

A circle according to one embodiment can be considered as a digital and computational construct within which RWD can be identified, analyzed, and aggregated to support the development of RWE for specific medical indications, treatment paths, patient cohorts or other clinically- and scientifically-relevant criteria. The CBU 52 can be arranged to manage and apply governance policies and/or rules that dictate which information can be shared and with whom. The CBU 52 can operate as the control mechanism that maintains and ensures compliance with HIPAA/HITECH requirements. If the circle allows for protected healthcare information, the data can be shared across all members of that circle. Each circle can be focused on a specific pathology and treatment. The data collection can be made available and/or displayed through an observational protocol.

The observational protocol can dictate which surveys are to be completed and when. The CBU 52 can be arranged to ensure that the surveys are completed in accordance with the protocol to maintain data integrity. This can all feed into the validity of a dataset. Given the constraints placed on the data, it can be considered to be valuable since it is narrow in focus. The CBU 52 can be arranged to auto-generate protocols, including observational protocols, based on, for example, the pathology and/or treatment and then augment the data with new relevant information, thereby permitting a comparison between the treatment paths.

The CCC 54 can, with the auto-generation or inheritance of observational protocols, analyze data in substantially the same way as with canonical questions. The CCC 54 can include (or create) a derivative protocol that can contain substantially the same canonical surveys and intervals. The CCC 54 can define the intervals and enrich the canonical surveys with new data collection requirements. When comparing like circles (for example, assumed traits that are related and valid for comparison) the CCC 54 can generate instructions and/or data to render a graph that can be sliced into many cohorts to achieve greater insight around the treatments.

FIG. 2 shows another non-limiting embodiment of a CRWE system 100, constructed according to the principles of the disclosure. The CRWE system 100 can be configured to implement the various aspects of the solution. The system 100 can include one or more computing devices 110, a storage 120, a network interface 130, an input-output (TO) interface 140, a driver suite 150, a canonical builder unit 160, a scorer unit 170, a real-world data (RWD) processor unit 180 and/or a circle processor unit 190. The CRWE system 100 can include a bus 105, which can be connected to any or all of the components 110 to 190 by one or more communication links.

Any one or more of the components 150 to 190 can include a computing device that is separate from the computing device(s) 110, as seen in FIG. 2, or integrated with the computing device(s) 110.

Any of the components 130 to 190 can include a computer resource that can be executed on the computing device(s) 110 as one or more processes. The computer resources can be contained in the storage 120.

The bus 105 can include any of several types of bus structures that can further interconnect to a memory bus (with or without a memory controller), a peripheral bus, and a local bus using any of a variety of commercially available bus architectures.

The computing device(s) 110 can include any of various commercially available processors, including multi-processor or multi-core architectures. The computing device 110 can include a central processing unit (CPU) or a graphic processing unit (GPU). The computing device 110 can be arranged to interact with any of the components 120 to 190 to carry out or facilitate with the processes in the solution.

The storage 120 can include a read-only memory (ROM) 120A, a random access memory (RAM) 120B, a hard disk drive (HDD) 120C, an optical disk drive (ODD) 120D, and a database (DB) 120E. The storage 120 can provide non-volatile storage of data, data structures, and computer-executable instructions, and can accommodate the storage of any data in a suitable digital format.

The storage 120 can include a computer-readable medium that can hold executable or interpretable computer code (or instructions) that, when executed by the computing device 110, cause the steps, processes, and methods in this disclosure to be carried out. The computer-readable medium can be contained in the HDD 120C or ODD 120D. The computer readable medium can include sections of computer code that, when executed, cause the system 100 to build or train the machine-learning model using training dataset and testing datasets, or to update the model on an ongoing basis during operation of the CRWE system 100.

A basic input-output system (BIOS) can be stored in the non-volatile memory 120A, which can include, for example, a ROM, an erasable programmable read-only memory (EPROM), or an electrically erasable programmable read-only memory (EEPROM). The BIOS can contain the basic routines that help to transfer information between any one or more of the components 110 to 190 in the system 100, such as during start-up.

The RAM 120B can include dynamic random access memory (DRAM), a synchronous dynamic random access memory (SDRAM), a static random access memory (SRAM), a non-volatile RAM (NVRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from or to a compact disk (CD)-ROM disk (not shown) or read from or write to other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 120E can store the real-world data, as well as model training datasets and testing datasets for the ML model used by, for example, the RWE processor 40 (shown in FIG. 1), or, more specifically, the predictor unit (PU) 48 (shown in FIG. 1) to predict, for example, what is a normal boundary for a medical treatment path. The DB 120E can include the self-referencing question tables used by, for example, the IU 22 (shown in FIG. 1), to provide data integrity and support the concept of canonical questions.

Any number of computer resources can be stored in the storage 120, including, for example, a program module, an operating system (not shown), one or more application programs (not shown), or program data (not shown). Any (or all) of the operating system, application programs, program modules, and program data can be cached in the RAM 120B as executable sections of computer code.

The network interface 130 can be connected to an internal or external network (not shown) or the Internet (not shown). The network interface 130 can include a wired or a wireless communication network interface (not shown) or a modem (not shown). When used in a local area network (LAN), the system 100 can be connected to the LAN network through the wired or wireless communication network interface; and, when used in a wide area network (WAN), the system 100 can be connected to the WAN network through the modem. The modem (not shown) can be internal or external and wired or wireless. The modem can be connected to the system bus 105 via, for example, a serial port interface (not shown). The network interface 130 can include a receiver (not shown), transmitter (not shown) or transceiver (not shown).

The input-output (IO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the components 110 to 190 in the system 100.

The driver suite 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The canonical builder unit 160, scorer unit 170, RWD processor unit 180 and circle processor unit 190 can each provided as a separate computing device or computer resource or can be provided as an integrated suite of computer resources. The canonical builder unit 160 can include the canonical build 20 (shown in FIG. 1); the scorer unit 170 can include the scorer 30 (shown in FIG. 1); the RWD processing unit 180 can include the RWD processor 40 (shown in FIG. 1); and the circle processor unit 190 can include the circle processor 50 (shown in FIG. 1).

Any one or more of the canonical builder unit 160, scorer unit 170, RWD processor unit 180 and circle processor unit 190 can include one or more machine learning platforms, including one or more supervised machine learning platforms or one or more unsupervised machine learning platforms. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing plaintext and detecting or predicting plaintext passwords in strings of plaintext characters. The machine learning platform(s) can include the ML model, which can search, retrieve, and analyze RWD data from various disparate sources.

Figure 4:
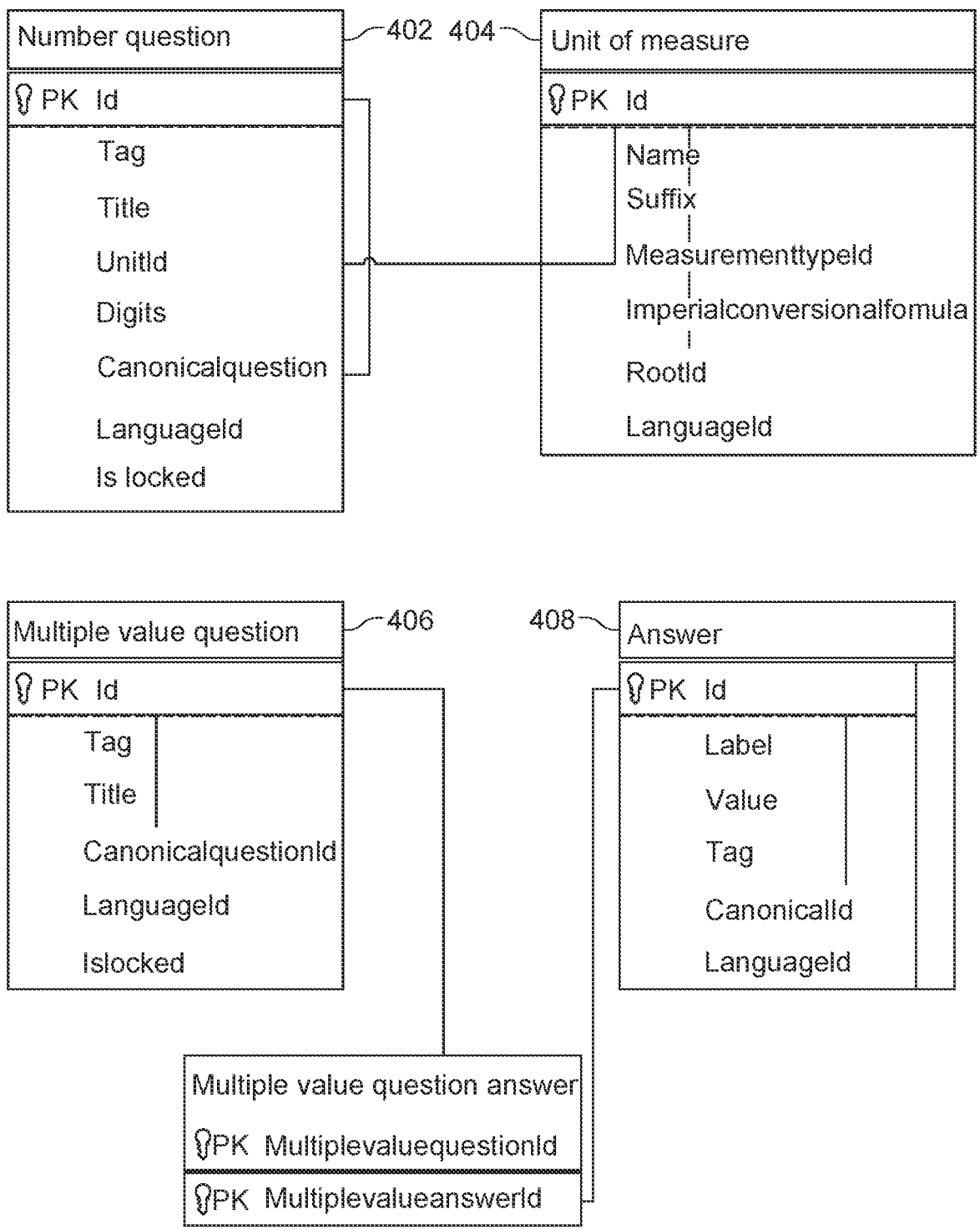
FIG. 4 depicts a non-limiting example of a question entity relationship diagram (ERD) process that can be carried out in accordance with one embodiment of the present invention.

FIG. 4 depicts a non-limiting example of a question entity relationship diagram (ERD) that can be utilized by embodiments of the CRWE systems 10 or 100, such as, for example by the canonical builder 20. As seen, a "NumberQuestion" table 402, a "UnitOfMeasure" table 404, a "MultipleValueQuestion" table 406 and an "Answer" table 408 can be created in the relational database (for example, DB 120E, shown in FIG. 2) and populated with data, including RWD data. Each record in the "NumberQuestion" table can include an identification for the table (Id), a tag (Tag), a title (Title), a descriptor (Untitld), a value (Digits), a canonical question identifier (CanonicalQuestionID), a language identifier (LanguageId), and lock value (IsLocked) such as "1" or "0." Relatedly, each record in the "UnitOfMesure" table can include an identification for the table (Id), a name (Name), a suffix (Suffix), a measurement type (MeasurementTypeId, for example, metric or imperial system), a formula to be used with the measurement type (ImperialConversionFormula), root location (RootId), and language (LanguageId). The data in the NumberQuestion table can link to the data in the UnitOfMeasure table, as seen in the non-limiting example seen in FIG. 4. The MutlipleValueQuestion table can similarly include a plurality of fields and can link to data in the Answer table, as seen in the on-limiting example in FIG. 4.

Figure 5:
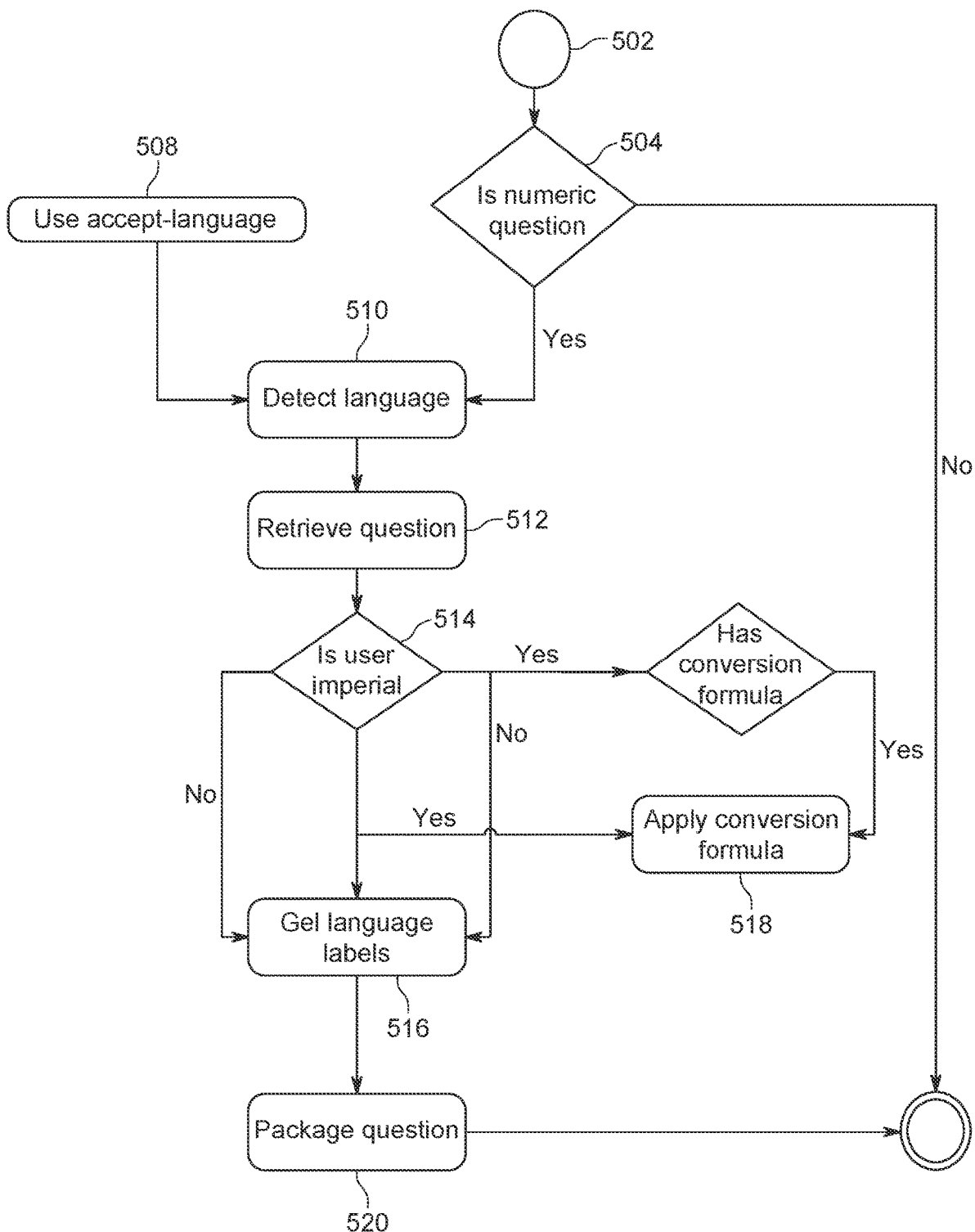
FIG. 5 depicts a non-limiting example of a unit of measurement (UOM) code conversion process carried out in accordance with one embodiment of the present invention.

FIG. 5 depicts a non-limiting example of a unit of measurement (UOM) code conversion process carried out by the CRWE systems 10 or 100, such as, for example, by the canonical builder 20 (for example, UMAU 26).

Figure 6:
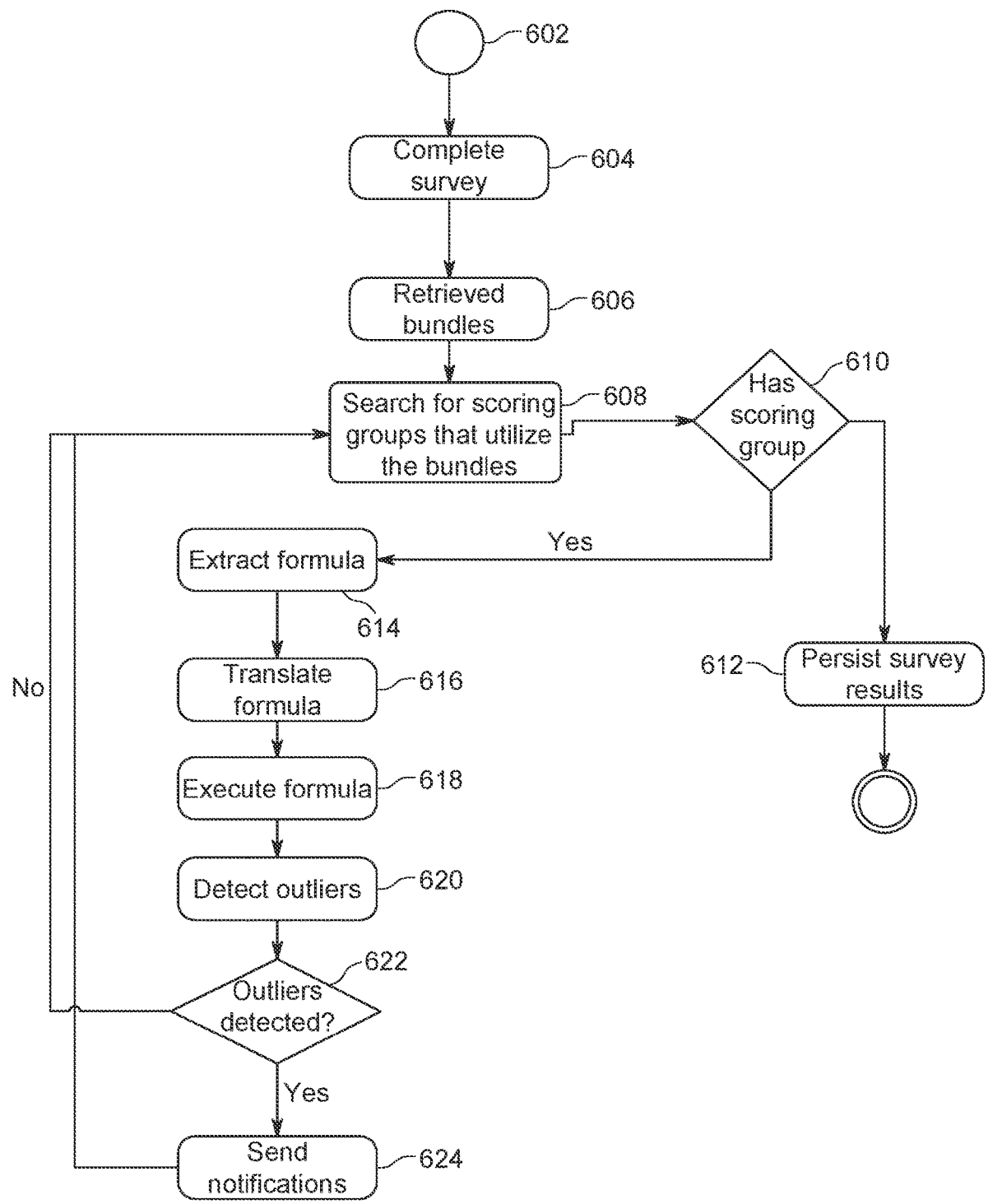
FIG. 6 depicts a non-limiting example of an automatic scoring process carried out in accordance with one embodiment of the present invention.

FIG. 6 depicts a non-limiting example of an automatic scoring process carried out by the CRWE systems 10 or 100, such as, for example, by the scorer 30.

Figure 7:
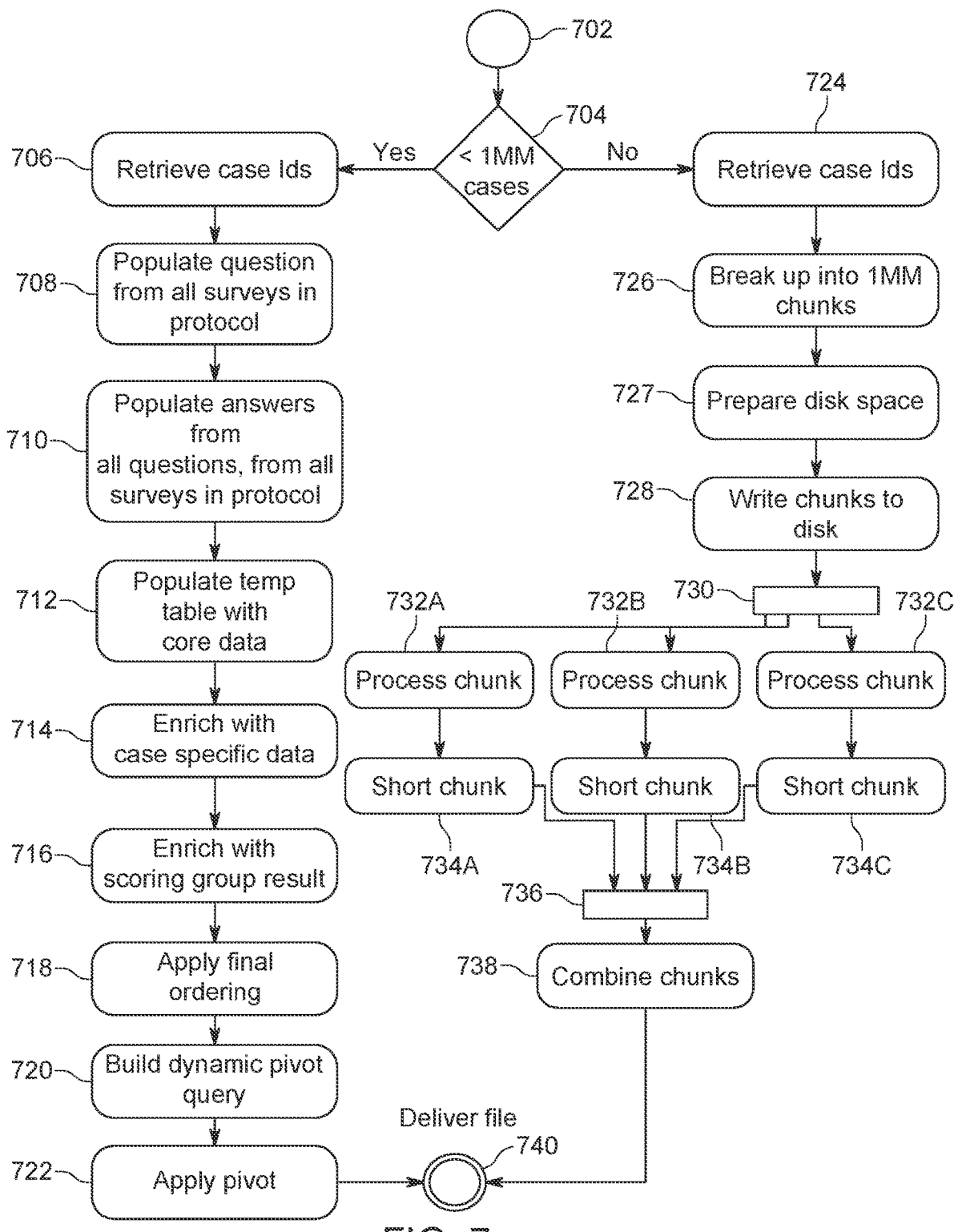
FIG. 7 depicts a non-limiting example of an export process carried out in accordance with one embodiment of the present invention.

FIG. 7 depicts a non-limiting example of an export process carried out by the CRWE systems 10 or 100, such as, for example, by the RWD processor 40 (for example, REU 46).

FIG. 8 depicts a non-limiting example of a patient portal graphic user interface (GUI) 802 that can be rendered by the CRWE systems 10 or 100, or by a computing device (not shown) at a patient location based on rendering instructions and data received from the CRWE systems 10 or 100. The patient portal can include a web application exclusively for access by patients 804. Patients can be first invited to join by email where they enroll, complete short surveys and immediately view their survey results quantified and graphed 806. Patients who wish to see how they progress over time therefore have more motivation to return, complete additional follow up surveys, and use their data to interact with their HCP.

FIG. 9 depicts a non-limiting example of a patient surveys GUI 902 that can be rendered by the CRWE systems 10 or 100, or by a computing device (not shown) at a patient location based on rendering instructions and data received from the CRWE systems 10 or 100. As seen, patient surveys 904 can be assigned a date value respective to the date of the treatment. On that date, the patient can be automatically invited to re-enter their patient portal, access the latest survey, and complete all responses. Data is immediately reported to the HCP, and back to the patient on the patient portal.

Figure 10:
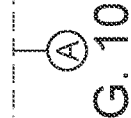
FIG. 10 depicts a non-limiting example of a case detail GUI that can be rendered in accordance with one embodiment of the present invention.

FIG. 10 depicts a non-limiting example of a case detail GUI 1002 that can be rendered by the CRWE systems 10 or 100, or by a computing device (not shown) at a patient location based on rendering instructions and data received from the CRWE systems 10 or 100. Cases can be managed on the case detail GUI (or screen), accessible only to the patient's HCP, in which they can complete surveys, monitor survey completion, and receive alerts such as overdue surveys, or survey results (scores) which are outliers 1004.

FIG. 11 depicts a non-limiting example of a dashboard GUI 1102 that can be rendered by the CRWE systems 10 or 100, or by a computing device (not shown) at a patient location based on rendering instructions and data received from the CRWE systems 10 or 100. The dashboard can provide every HCP user with tasks (for example, list of upcoming surveys which need attention) 1104, Alerts (for example, high priority tasks which need more immediate attention, such as outlier scores, overdue surveys, or invitations to circles) 1106 and statistics, such as total cases and patients.

FIG. 12 depicts a non-limiting example of a circle detail GUI 1202 that can be rendered by the CRWE systems 10 or 100, or by a computing device (not shown) at a patient location based on rendering instructions and data received from the CRWE systems 10 or 100. The circle detail GUI can provide all circle members with a branded home page, aggregated results from all scores, a shared observational protocol, subscription and case credits, and a membership list. Members to circles interact with their circle principally through case creation, when they decide with which circles they would like to share their case, and through reporting, where they funnel one or more circles into a shared report for analysis. Thus, the circle detail can be a simple "dashboard" for circle members.

Figure 13:
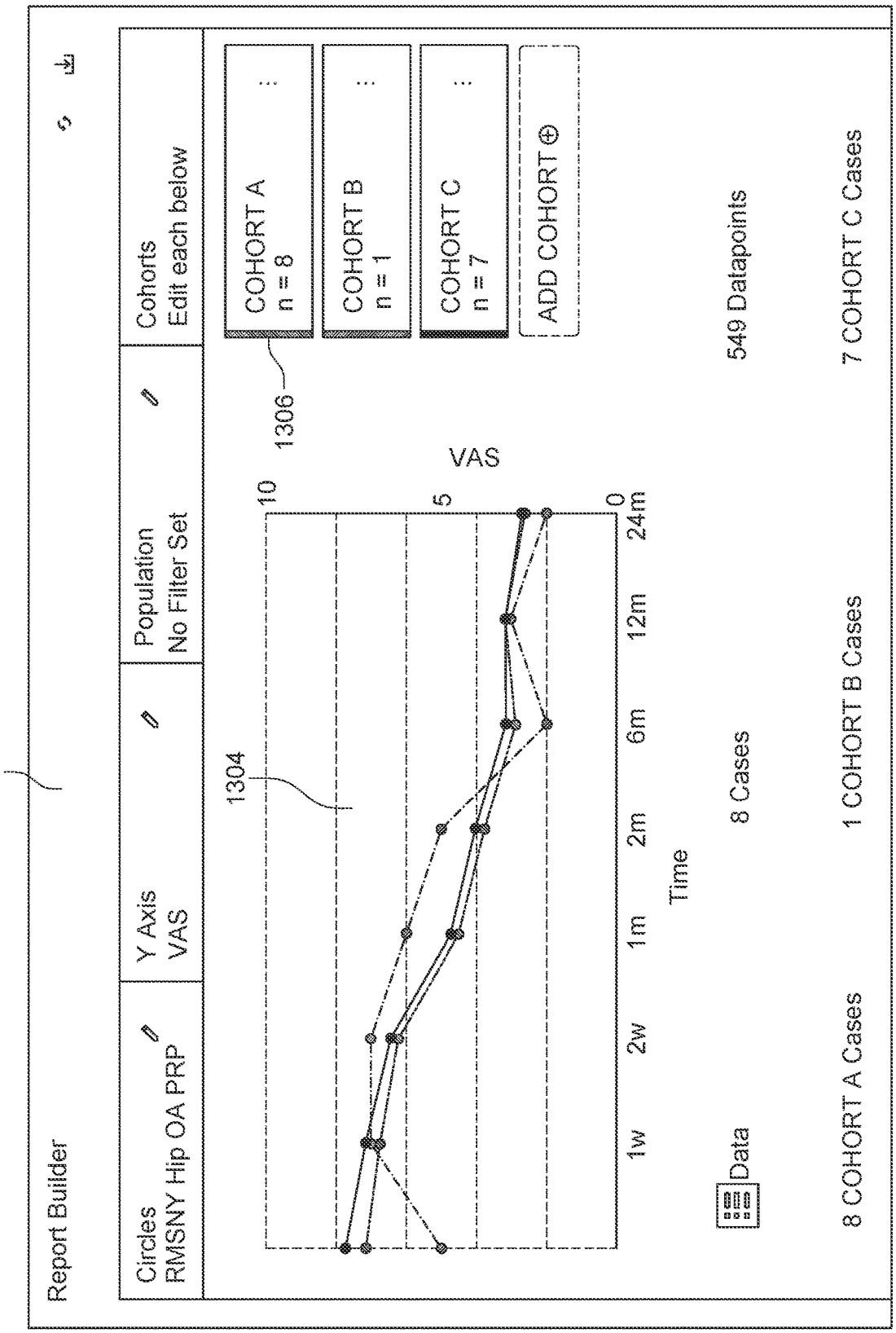
FIG. 13 depicts a non-limiting example of a report builder GUI that can be rendered in accordance with one embodiment of the present invention.

FIG. 13 depicts a non-limiting example of a report builder GUI 1302 that can be rendered by the CRWE systems 10 or 100, or by a computing device (not shown) at a patient location based on rendering instructions and data received from the CRWE systems 10 or 100. The report builder GUI can enable users to plot mean scores from cases across one or more circles to which they belong 1304. They can then create "cohorts" which filter the mean results based on criteria from answered canonical questions within the protocol 1306. This helps the user correlate certain canonical answers to better or worse mean outcomes, thus suggesting new best and more personalized methods of treatment. Users can export all results into a spreadsheet where every filtered case represents a row, and answers to all protocol questions are displayed in each column.

FIG. 14 depicts a non-limiting example of a cohort builder GUI 1402 that can be rendered by the CRWE systems 10 or 100, or by a computing device (not shown) at a patient location based on rendering instructions and data received from the CRWE systems 10 or 100. As noted earlier, a cohort can be a population of cases defined by certain answers to canonical questions. The user can use Boolean filters to crawl all available canonical questions and choose the answers by which they wish to filter their population set. The result is a new mean score, which may or may not be different from the control (all cases) mean score.

FIG. 15 depicts a non-limiting example of a canonical question construction GUI 1502 that can be rendered by the CRWE systems 10 or 100, or by a computing device (not shown) at a location based on rendering instructions and data received from the CRWE systems 10 or 100. A canonical question can be built within the CRWE systems 10 or 100, such as, for example, on admin panel, where the user types a question 1504, selects an answer format (for example, multiple selection), provides the available answers, if relevant, sets the units of measurement and provides translations for foreign users 1506. Canonical questions are subject to a rigorous design process to ensure quality, clinical efficiency, and broad applicability to the greatest number of users.

FIG. 16 depicts a non-limiting example of a formula builder GUI 1602 that can be rendered by the CRWE systems 10 or 100, or by a computing device (not shown) at a location based on rendering instructions and data received from the CRWE systems 10 or 100. If desired, canonical questions can be placed within a bundle, where their answers are assigned numerical values (for example, moderate=3). Bundles can then be placed within a formula builder to create total scores. Total scores calculate dynamically within the system once all answers are collected, and provide the patient, HCP, and others with top-level analysis of survey results.

Figure 17:
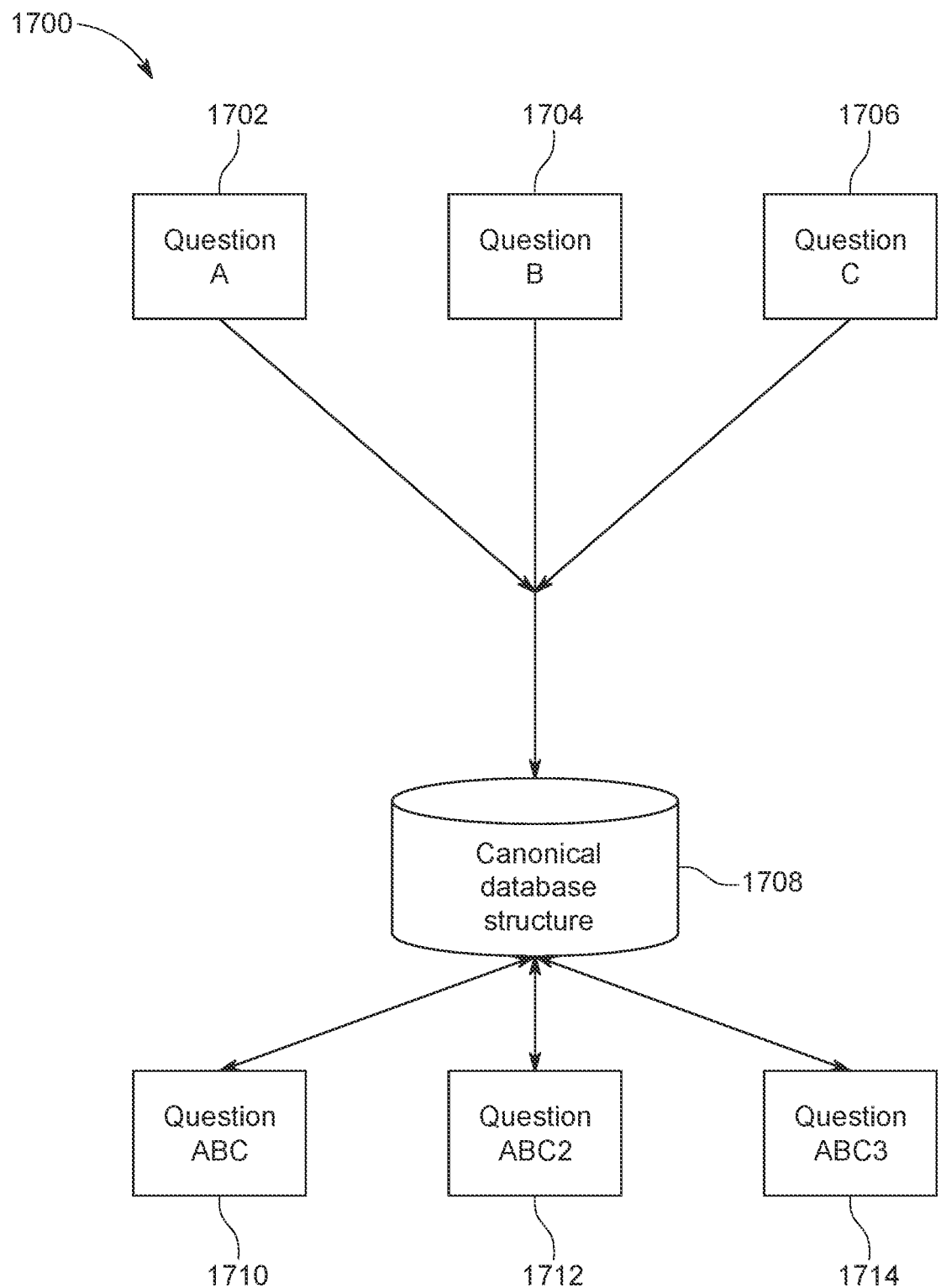
FIG. 17 depicts a non-limiting example of a canonical query structure that can be executed in accordance with one embodiment of the present invention.

FIG. 17 depicts a non-limiting example of a canonical query structure 1700 that can be executed by the CRWE systems 10 or 100, or by a computing device (not shown) at a location through interaction with the CRWE systems 10 or 100. In healthcare, innately "similar" questions can often be asked in disparate formats 1702, 1704, 1706, leading to data siloeization and difficulty in combination/correlation between systems, nations, or institutions. The CRWE systems 10 and 100 can design and/or reformat common answer types to find "canonical roots" which are of highest quality answers, clinically efficient to enter, and applicable to the largest number of users. These canonical questions can be stored in the SQL database 1708 (for example, 120E, shown in FIG. 2) and standardized in use by ALL users who wish to collect that type of data. This ensures immediate aggregation and comparable data sets. These questions can be displayed in the user's local language and unit of measurement system, expanding their utility and flexibility while preserving the same canonical root 1710, 1712, 1714.

Figure 18:
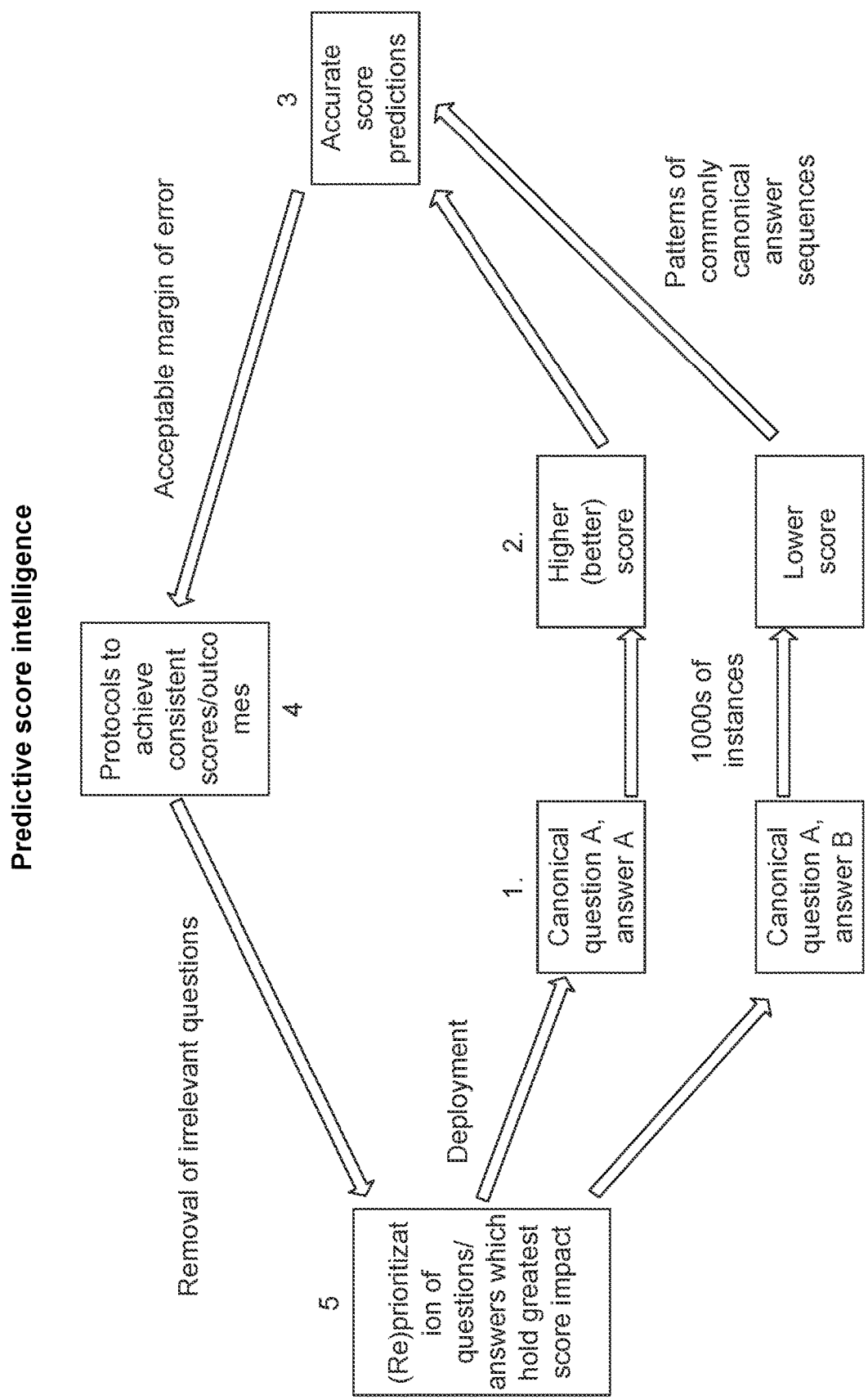
FIG. 18 depicts a non-limiting example of a predict score intelligence process that can be carried out in accordance with one embodiment of the present invention.

FIG. 18 depicts a non-limiting example of a predict score intelligence process that can be carried out by the CRWE systems 10 or 100 (shown in FIGS. 1 and 2, respectively). As seen, with every patient case, canonical answers can be recorded alongside the patient's score, or outcome. After thousands of entries, certain canonical answers can generally be associated with higher and/or lower scores. Compiling strings of canonical answers with consistent score effects can lead to more predictable scores, especially as more canonical answers within the string are provided. Strings of canonical answers, with an acceptable margin of error, can inform new evidence-based protocols, such as, for example, patient selection criteria, personalized treatment methodologies or other defined "answers" associated with better outcomes. Certain questions and their answers which have less impact on outcomes can thus become less relevant, and questions with the highest impact on scores are re-prioritized, impacting efficiency of data entry, and development of new questions to inform protocol adjustments.

The satisfactory demonstration of a product, device drug, clinical procedure's safety and efficacy, etc., typically requires two or more clinical collaborators adhering to a single controlled and shared protocol. Collaboration between clinicians poses a number of challenges. For example, each clinical site is likely to have their own clinical approaches, capabilities, equipment, and even opinions with respect to any given protocol. A secondary challenge is that typically when a clinician enrolls cases in a given clinical trial, such cases are locked within that dataset and not available across other clinical studies in which data from such data might be highly relevant and illuminating with respect to clinical outcomes under observation. Additionally, because of the sensitive nature of PHI, technologies, policies and professionals that utilize such data have heretofore failed to fully and adequately embrace the flexibility, accessibility, and capability of cloud based data sharing that has become pro forma across many other industries.

Figure 19:
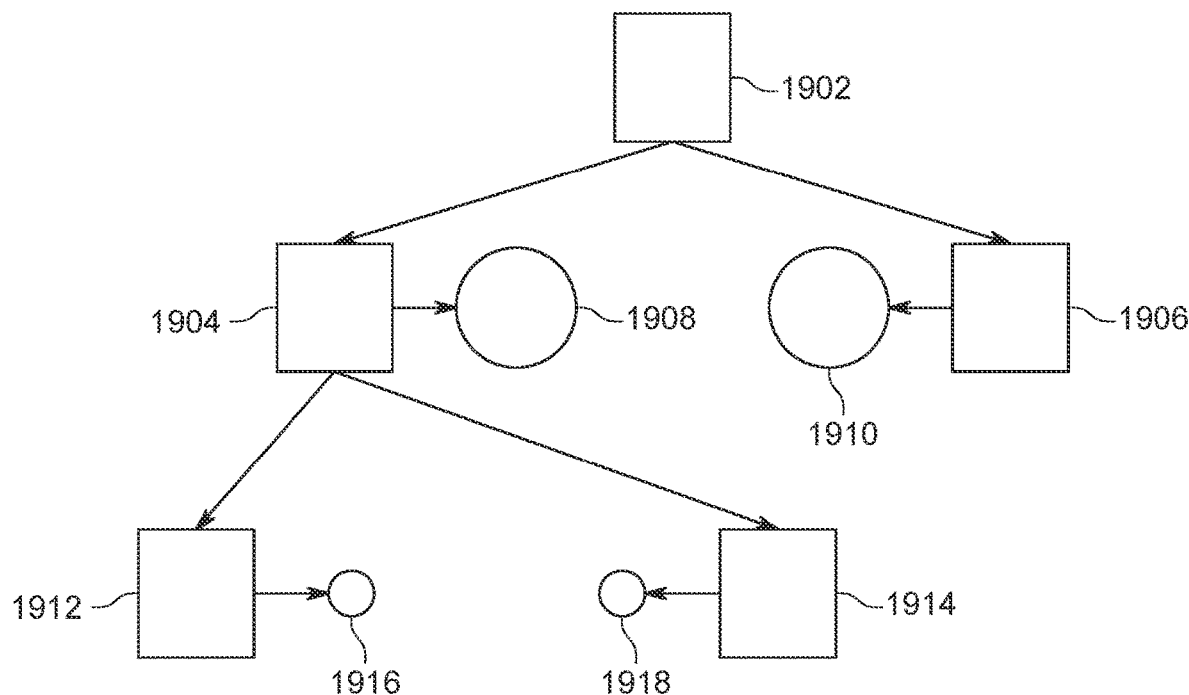
FIG. 19 depicts a non-limiting example of the relationship between protocols and circles in accordance with one embodiment of the present invention.

As described above, the CRWE may implement protocols and circles such that one or more protocols may be associated with one or more circles. Circles and protocols as used herein and understood by those of skill in the art are data structures optimized for consumption by the components described herein for implementing a computer-based real-world evidence (CRWE) solution that can handle disparities in real-world data (RWD) that might otherwise not be combinable or that might originate from disparate or heterogeneous sources. The use of protocols and circles as set forth herein provides a solution to the above-identified data sharing, access, and reuse issues that are limiting the full potential of clinical data collected globally. FIG. 19 depicts one embodiment of the relationship between protocols and circles in accordance with one embodiment of the invention.

In accordance with the embodiment of FIG. 19, one or more root protocols 1901 are created within the CRWE. A given root protocol may be related to a specific pathology, e.g., knee osteoarthritis, a specific body part or body location, etc., e.g., knees. More generally, a protocol may be though of as a set of related canonical questions that require resolution as part of completion of the protocol. According to other embodiments, a protocol may comprise one or more answer types, questions, scoring groups, surveys, survey schedules, etc., which may be directed towards a specific pathology, e.g., knee osteoarthritis. As such, the CRWE may maintain a library of root protocols directed towards a variety of disparate or overlapping pathologies, which the CRWE may periodically update and adjust with new and/or updated information regarding the focus of a given root protocol.

As suggested above, however, different clinicians desire to capture disparate types of data relevant to a given pathology. Assuming that the pathology under consideration is, for example, knee osteoarthritis, a first clinician or group of clinicians may be interested in protocols relating to surgical interventions 1904, whereas a second clinician or group of clinicians may be interested in protocols relating to pharmaceutical interventions 1906. It would be inefficient and burdensome for both sets of clinicians to implement the same protocol 1902 given the disparate techniques under consideration. Thus, forcing one protocol for all might limit the number of sites, exclude valuable inputs, and/or incur a greater financial impact.

Accordingly, a clinician or group of clinicians can branch or otherwise fork a root protocol to create a circle protocol, 1904 and 1906. A circle protocol according to one embodiment, e.g., 1904, comprises further customizations to a given root protocol 1902 in which the clinician selects a subset of components comprising the root protocol, canonical questions, surveys, diagnostic tests, etc., and may add additional components, which may be pushed back into the root protocol. For example, where the root protocol 1902 is directed towards knee osteoarthritis and a circle protocol 1904 is a refinement on the root protocol relating to surgical interventions regarding the same, the circle protocol 1904 may prescribe the use of both x-ray and MRI imaging before and after the surgical procedure. Protocol components such as these, to the extent that they are not already a part of the root protocol, are added thereto so that subsequent circle protocols that inherit the root protocol may choose to include or remove such imaging therein. The circle protocol, by hiding, archiving, adding, and/or substituting components to a root protocol yields a custom, efficient, and circle specific protocol based on its root protocol.

Once a clinician determines a given circle protocol 1904 and 1906, the protocol is applied to a circle, 1908 and 1910, respectively, whereby clinicians associate patient cases with the circle and, therefore, the given circle protocol that the circle implements. As a patient represented by a corresponding case completes components comprising the circle protocol, the CRWE identifies, analyzes, and aggregates the corresponding RWD to support the development of RWE for the specific medical condition, treatment paths, patient cohorts, or other clinically and scientifically-relevant criteria that is the focus of the circle protocol.

Since multiple clinicians may be participating an in a circle protocol by enrolling cases in the corresponding circle(s), there are circumstances where two or more clinicians may find that they have differing opinions with respect to various aspects of a given circle protocol, utilize or have access to disparate equipment, different clinical techniques, etc.; essentially one among any number of reasons for a given clinician to not or otherwise be unable to exactly follow the requirements of a given circle protocol. Accordingly, a clinician may utilize the CRWE to create one or more circle protocols, which may inherit one or more components from one or more corresponding root protocols, whereby a given circle protocol 1904 may further branch into one or more circle sub-protocols, 1912 and 1914.

A circle sub-protocol according to one embodiment, e.g., 1912 and 1914, comprises further customizations to a given circle protocol 1904 in which the clinician selects a subset of components comprising the root protocol, e.g., canonical questions, surveys, diagnostic tests, etc., and may add additional components, which may be pushed back into the circle protocol as well as the corresponding root protocol(s). Once a clinician determines a given circle sub-protocol 1912 and 1914, the sub-protocol is applied to patient cases enrolled in a corresponding a user or clinician circle, 1916 and 1918, respectively. A clinician enrolls patient cases into the clinician circle associated with the circle sub-protocol, which may implicitly or explicitly associate such cases with the circle from which the clinician circle depends. It is intended that data structures described herein that instantiate root protocols, circle protocols, and circle sub-protocols, in addition to the association of patient cases into circles that implement such protocols, is intended to be carried out by software program code adapted to process such data structures that, in accordance with certain embodiments, is implemented by the CRWE.

Figure 20:
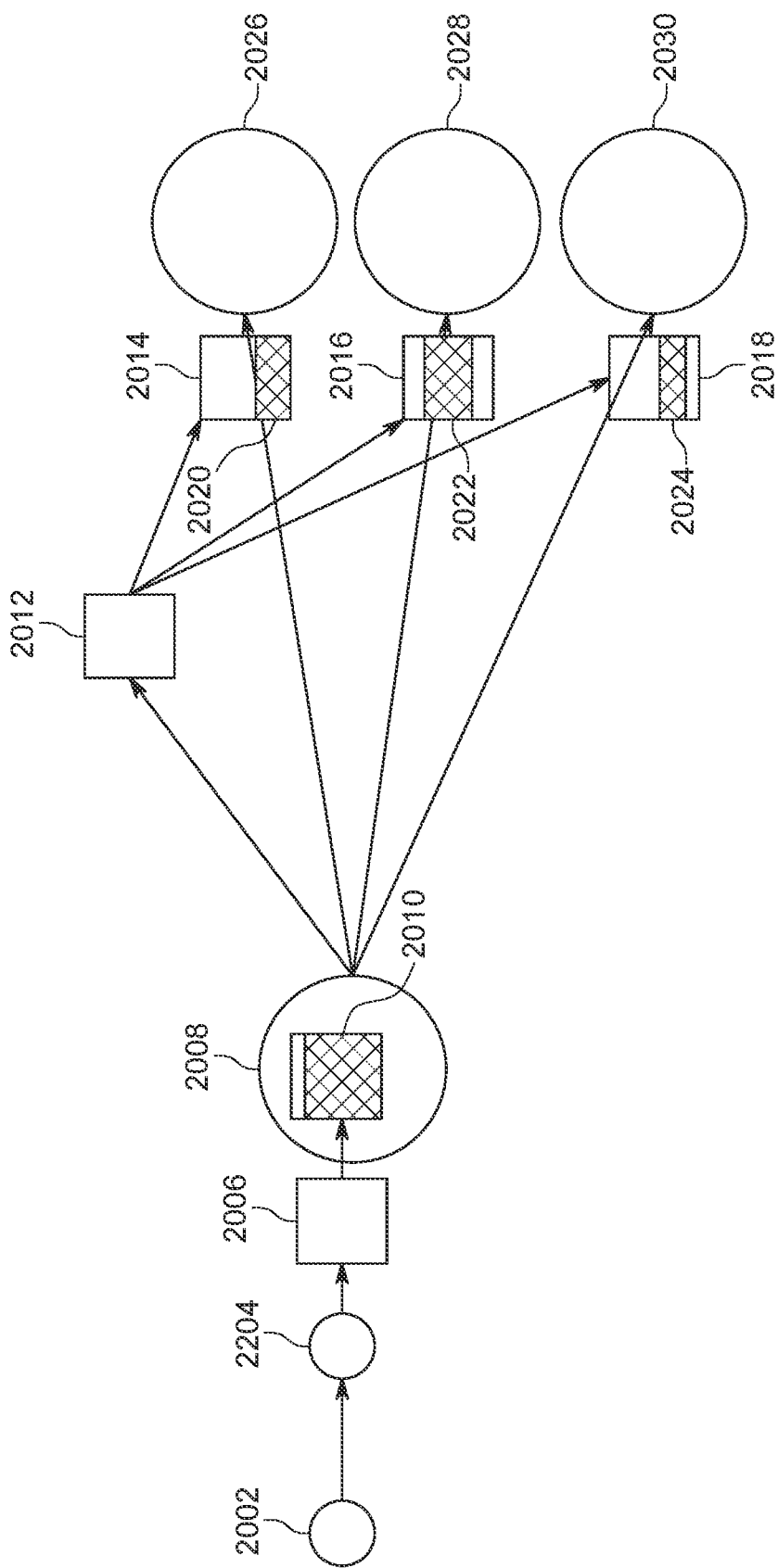
FIG. 20 depicts a non-limiting example of the programmatic data sharing relationships between various protocols and circles in accordance with one embodiment of the present invention.

FIG. 20 expands upon the programmatic data sharing relationships between various protocols and circles introduced by FIG. 19 in accordance with one embodiment of the invention. In accordance with the access relationships that FIG. 19 illustrates, a clinician 2002 enrolls a patient case 2004 in a clinician circle that is associated with a circle sub-protocol 2006 that specific clinician is implementing. The circle sub-protocol, by the nature of it deriving a "child" relationship with its "parent" protocol, which in the present embodiment is circle protocol 2010, implements two constraints: 1) the circle sub-protocol implements a subset of components comprising the circle protocol from which it depends (circle sub-protocol components are pushed up to its parent circle protocol and root protocol), and 2) the cases in the clinician circle that the circle sub-protocol is associated with are also part of the circle from which the clinician circle depends. In this manner, patient case data included as part of the clinician circle that is implementing the circle sub-protocol 2006 is shared with other participants in the parent circle 2008, but the clinician maintains control of his or her data contained in the clinician circle.

As FIG. 20 further illustrates, the circle protocol 2010 that the circle 2008 implements may be derived from a root protocol 2012, which is a superset of the components comprising the circle protocol 20210 and circle sub-protocol 2006. Similarly root protocol serves as the root protocol for several other circle protocols 2014, 2016, and 2018, such that root protocol 2012 is a superset of all components comprising the various circle protocols 2010, 2014, 2016, and 2018 that derive from the root protocol 2012. Not all components comprising circle protocol 2010, however, are necessarily utilized by other circle protocols 2014, 2016, and 2018 that derive from the root protocol 2012. That said, one or more components comprising the circle protocol 2010 may be utilized by the other circle protocols 2014, 2016, and 2018.

A clinician collecting patient case data in accordance with a circle protocol 2010 has the option to share such patient case data with other circle protocols 2014, 2016, and 2018 that utilize the components that the clinician utilizes as part of circle protocol 2010. Put another way, patient case data may bae shared, as filtered by the specific circle protocol 2010 in accordance with which it is being collected, with other related circles, 2026, 2028, and 2030, in addition to all clinicians who are members of the circle 2008 associated with the circle protocol. This has the benefit of allowing the clinician to use his or her patient case data 2010 to supplement data sets 2020, 2022, and 2024 collected by related circle protocols as they tree up to a common root protocol 2012. Accordingly, a single case may therefor be shared among multiple circles without any redundancy in effort, only sharing patient case data that the clinician deems relevant.

One constraint that the CRWE may impose on data accessibility is that a clinician may only extract patent case data from other circle protocols that is congruent with or otherwise matches the data types or classes shared with such other circles. For example, where the circle protocol 2010 captures height, weight, sex, and MRI imagery, these data points may be shared with other circle protocols that are capturing the same data from its patient population, as well as allowing the clinician to view such data points from those patient populations in the other circles associated with the other circle protocols. Continuing with the forgoing, where one of the other circle protocols collected ultrasound imagery, which was not collected by the circle protocol, clinicians participating as part of circle 2008 would not have access to such ultrasound imagery. According to some embodiments, a clinician or administrator of a circle 2008 is tasked with configuring the CRWE system as to those data points for sharing with other circles 2026, 2028, and 2030. Furthermore, sharing of patient case data between circles may be made in accordance with the privacy design of the primary circle from which the patient case data originates, e.g., where the primary circle is PHI-free, patient PHI is not pushed to other circles that have patients adhering to circle protocols that derive from the same root protocol.

Figure 21:
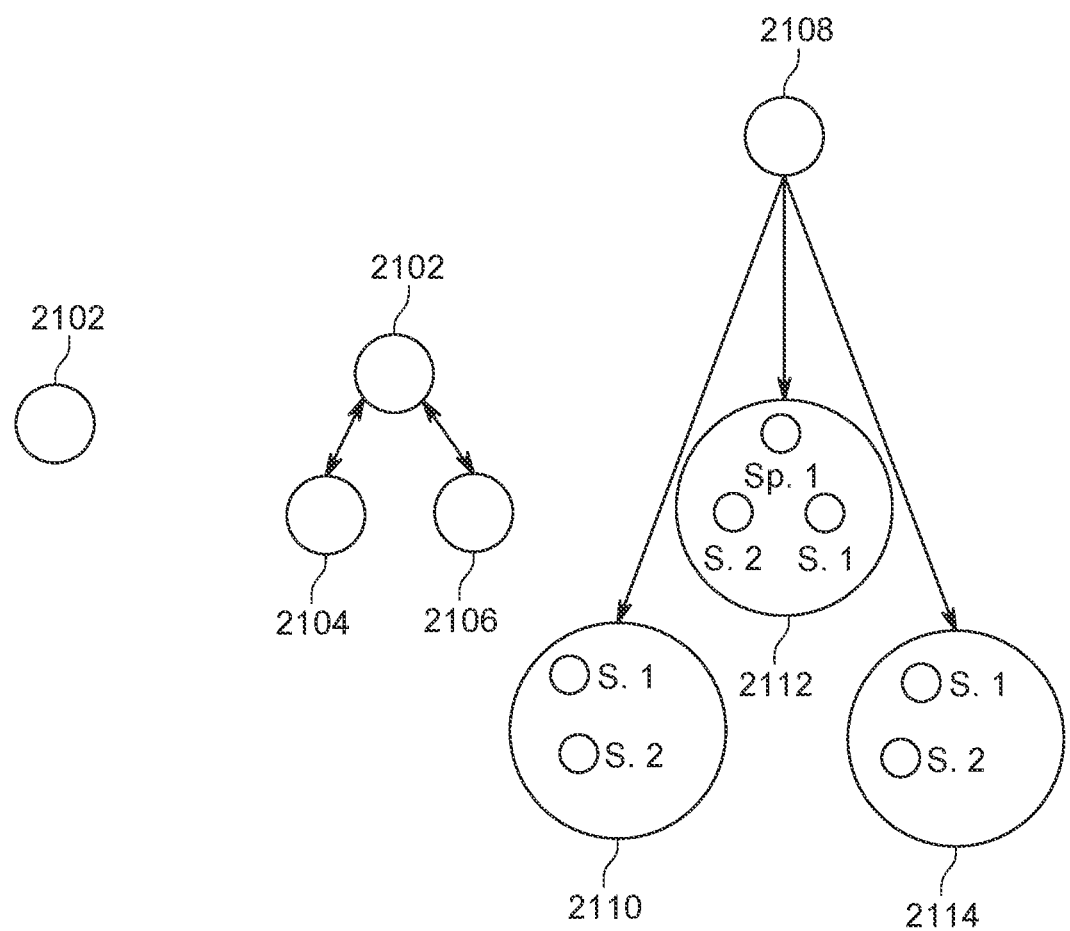
FIG. 21 depicts a non-limiting example of data access as exposed by the roles played by various users of embodiments of the CRWE system in accordance with one embodiment of the present invention.

FIG. 21 depicts a non-limiting example of data access as exposed by the roles played by various users of embodiments of the CRWE system as described herein. The atomic data access unit in accordance with the present embodiment is the clinician himself or herself 2102, in which the clinician has the ability to enroll his or her patients in circles, create cases for such patients for association with one or more circles, apply methodologies set forth by various circle protocols and sub-protocols, as well as access data generated against any such cases and from other similar cases when such data is shared with other circles in the CRWE system.

The clinician 2102, or an agent acting on his or her direct behalf, such as staff or administration, may elect to invite one or more team members, 2104 and 2106, who may be clinicians within a group that the clinician 2102 operates or participates on behalf of, or peer clinicians from other units, facilities, etc. As with the clinician 2102, invited team members 2104 and 2106 each have the ability to enroll patients in circles, create cases for such patients for association with one or more circles, apply methodologies set forth by various circle protocols and sub-protocols, as well as access data generated against any such cases and from other similar cases when such data is shared with other circles in the CRWE system.

As described herein, circles can be defined by the CRWE systems 10 or 100 as implementing circle protocols and circle sub-protocols. When creating circles to which subscribe cases or when subscribing cases against existing circles, the clinician 2108 is provided with three options to affect data sharing among clinicians that are subscribing patients in a given circle (and therefore providing data to such circles): PHI 2114, PHI-free 2110, or Sponsor 2112. Where a circle is set as a PHI circle 2114, data that the clinician collects regarding a given case, including personally identifiable information including, but not limited to, name, birthdate, contact information, social security numbers, etc., is share with all other members of the circle, subject to the circle protocol or circle sub-protocol according to which the circle operates. In a PHI-free circle 2110, by contrast, personally identifiable information is split from non-personally identifiable information collected in accordance with a given circle protocol or circle sub-protocol, whereby the clinician 2108 only the shares non-personally identifiable information with the circle, regardless or the privileges of other members of the circle. Finally, in a Sponsor circle 2112, which may comprise PHI or be PHI-free, the circle sponsor, which may be a university, pharma company, etc., has access to all data provided to the circle by the various subscribers that are providing data to the circle.

According to one embodiment, one a clinician is part of a circle, whereby he or she is subscribing patient cases and providing data in accordance with any circle protocols or circle sub-protocols, the clinician is provided with access to data in the circle provided by other clinicians who are subscribing patient cases and pricing data in according with any circle protocols or circle sub-protocols. Such access may be limited by constraints that include, but are not limited to, 1) the circle permission described above (e.g., PHI, PHI-free, or Sponsor) and 2) a clinician may only access patient case data that matches his or her own protocol. For example, assume three circle sub-protocols, all of which tree up to a parent circle protocol, wherein two circle sub-protocols capture MRI images, but a third circle sub-protocol does not, clinicians participating in the third sub-protocol would not be able to view MRI images. While certain embodiments allow a clinician, who wishes to leave a circle to take any patient cases that he or she created and/or provided to a given circle, i.e., maintain ownership over such patient cases, copies of the data comprising such cases may also remain behind for all circle members to review with future patient cases created by the clinician private to such clinician.

The following scenario presents a non-limiting use-case that is based upon various embodiments of the present invention described and discussed herein. The present use-case begins with an orthopedic surgeon, e.g., a clinician, who wishes to conduct a study on knee osteoarthritis, beginning with the existing patient population comprising her private practice. Using embodiments of the CRWE system discussed and described herein, the surgeon builds an exemplary team comprising her physician's assistant and nurse administrator, establishing her account for her team with the CRWE system.

Once the clinician and teammates are defined, the surgeon builds and names a circle, e.g., "Biologics in Knee OA", with no additional members, and begins designing her observational protocol comprising patient age, biologic treatment, and the standardized Knee Injury and Osteoarthritis Outcome Score ("KOOS"), which is a knee-specific instrument developed to assess patient opinion regarding knee and associated problems. Building on the nomenclature introduced here, this exemplary protocol would be a circle sub-protocol, though it would (at least until another circle sub-protocol were spawned) match entirely the circle protocol to which it belongs. The circle protocol would be a child of the root protocol "Knee OA", which is already available on the CRWE system for inheritance by circle protocols and circle sub-protocols. The surgeon may choose to enable viewing PHI so as to better correlate the results to identifiable patients.

Continuing with the present use-case, assume that the surgeon enrolls ten (10) patients, assigning them the circle "Biologics in Knee OA". They are prescribed her circle sub-protocol, with resulting data shared to her Circle complete with PHI. She can access, correlate, and export any portion of such data at any time.

Further assume that the surgeon meets a colleague at a conference, who states that knee replacements have better outcomes than biologic treatments. A debate commences, and both parties find four (4) clinical collaborators who share their opinion. Accordingly, the surgeon and her colleague may create a second circle, based upon the original circle protocol, but with the addition of a question about joint replacements, e.g., a circle sub-protocol. They each invite their clinical collaborators to join the circle, each of whom makes slight adjustments in the complexity of their protocols, but keeps the same canonical questions "age, treatment type, KOOS". All agree to keep PHI out of the circle.

When the surgeon obtains additional patients, she and her team may enroll each into her primary circle and her secondary circle. She is not charged twice by the CRWE system and, advantageously, only enters in data once. Furthermore, the Cases PHI is shared with her primary circle, whereas it is automatically separated and removed before being shared with the secondary circle. Moreover, she may review all cases within either circle at any time but can only review the aggregated data entered against her circle sub-protocol, e.g., age, treatment, KOOS.

Finally, assume this community and resulting data attracts the attention of a Sponsor, e.g., a corporate entity, who invites 50% of the collaborators to run a study. The Sponsor creates a new Circle, sets it as PHI-Free, but makes itself the Circle Administrator. The requested collaborators are invited to this Circle, where they can review the Sponsor's circle protocol, as well as develop their own (outside of the CRWE system, the Sponsor may choose to restrict customization options). Meanwhile, the Sponsor can generate data at any time from their Circle Protocol (without needing a User Protocol) for purposes of their study, regulatory, marketing, or other uses.

In view of the scenario presented by the foregoing use-case, the surgeon would now be provided with access to three similar Circles, but each with different rules, members and uses. Depending upon the compatibility of her circle sub-protocol to their Circle protocols, however, she can share a single case among all three Circles, satisfying her own, her collaborative, and her industry sponsor's requirements. This cuts down on cost of patient recruitment and enrollments, which are amongst the most expensive costs associated with running traditional trials and research.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for building a relational database containing canonical answer datasets, the method comprising:

providing a canonical answer table, wherein fields of the canonical answer table are populated with canonical answers derived from real world data, and wherein each answer in the canonical answer table is associated with a respective canonical question;

associating, by the processor, canonical answers in the canonical answer table with one or more protocols within a hierarchy of protocols and with one or more circles, wherein the hierarchy of protocols includes:

a plurality of circle protocols including a first circle protocol and a second circle protocol, wherein the first circle protocol comprises a first set of canonical questions and wherein the second circle protocol comprises a second set of canonical questions, and a first circle sub-protocol, wherein the circle sub-protocol is a child protocol of the first circle protocol in the hierarchy, wherein the first circle sub-protocol comprises a third set of canonical questions including at least a subset of the first set of canonical questions and optionally one or more additional canonical questions, and wherein the circles include
- a first circle associated with the first circle protocol and with a first group of one or more users, and
- a second circle associated with the second circle protocol and with a second group of one or more users, wherein each of the circles is a construct configured to aggregate canonical answers in the canonical answer table that are responsive to a respective set of canonical questions of a respective protocol and derived from real world data received from one or more users in a respective group;

selectively providing, by the processor, a user associated with a given circle among the circles access to canonical answers in the canonical table according to the given circle that the user is associated with, a given protocol associated with the given circle and data sharing rules for one or more of the protocols in the hierarchy.

2. The method of claim 1, further comprising:
receiving, by a processor, a plain language question from the user via a computing device;
converting, by the processor, the plain language question to a canonical question;
searching, by the processor, the relational canonical database based on the canonical question;
retrieving, by the processor according to the data sharing rules, one or more canonical answers that correspond to the canonical question; and
sending, by the processor, display rendering instructions and data to the computing device to display by a graphic user interface on the display at least two of:
the retrieved one or more canonical answers,
the plain language question, and
the real-world data corresponding to the retrieved one or more canonical answers.

3. The method of claim 1, wherein, according to the data sharing rules, the user associated with the given circle is granted access to any canonical answers in the canonical answer table that correspond to a canonical question of the given protocol.

4. The method of claim 1, wherein, according to the data sharing rules, the user associated with the given circle is granted access to any canonical answers in the canonical answer table that are associated with a child protocol of the given protocol and that correspond to a canonical question which is shared by the child protocol and the given protocol.

5. The method of claim 1, the protocols including a root protocol comprising a superset of components of the circle protocols and any circle sub-protocols, wherein, according to the data sharing rules, the user associated with the given circle is granted access to canonical answers in the canonical answer table that are associated with another child protocol of the root protocol and that correspond to a canonical question which is shared by the another child protocol and the given protocol.

6. The method of claim 1, the protocols including a root protocol comprising a superset of components of the circle protocols and any circle sub-protocols, wherein the root protocol comprises all canonical questions of the circle protocols and the circle sub-protocol, and wherein canonical answers to any canonical question of the circle protocols or circle sub-protocol are automatically associated with the root protocol.

7. The method of claim 1, wherein, according to the data sharing rules, canonical answers to a canonical question common to the first circle protocol and the second circle protocol is automatically shared among the first and second groups of users.

8. The method of claim 1, the protocols including a root protocol comprising a superset of components of the circle protocols and any circle sub-protocols, wherein the root protocol has a highest level in the hierarchy of protocols, wherein, according to the data sharing rules, canonical answers to a canonical question that is shared by at least two different protocols which have a same level in the hierarchy and which are children of a same higher-level protocol, are shared among users within circles associated with any of the at least two different protocols.

9. The method of claim 1, wherein, according to the data sharing rules, access to canonical answers to a canonical question that is unique to the given protocol is restricted to users associated with a given circle associated the given protocol.

10. The method of claim 1, wherein, according to the data sharing rules, access to canonical answers to canonical questions that are unique to the given protocol are restricted to only users authorized to access the given protocol.

11. The method of claim 1, further comprising:
authorizing, by the processor, users in the first group of users to enroll patient cases to the first circle and record real-world data for those patient cases according to the first circle protocol;
authorizing, by the processor, users in the second group of users to enroll patient cases to the second circle protocol and record real-world data for those patient cases according to the second circle protocol.

12. The method of claim 1, further comprising:
receiving, by the processor, real-world data containing disparate and heterogeneous types of data and comprising real-world questions and corresponding real-world answers;
building, by the processor, the canonical answer table, the step of building and populating the canonical answer table including:
for each real-world question and corresponding real-world answer, mapping the real-world question to a respective canonical question in the database, and populating a corresponding field in the canonical answer table using the corresponding real-world answer.

13. A system for building a canonical relational database containing canonical question datasets and canonical answer datasets, the system comprising:
a canonical answer table, wherein fields of the canonical answer table are populated with canonical answers derived from real world data, and wherein each answer in the canonical answer table is associated with a respective canonical question; and
a circle processor arranged to create and manage access to circles by respective groups of one or more users,
wherein the circle processor is configured to associate canonical questions and corresponding canonical answers in the canonical answer table with one or more circles and one or more protocols within a hierarchy of protocols,
the hierarchy of protocols including:
a plurality of circle protocols including a first circle protocol and a second circle protocol, wherein the first circle protocol comprises a first set of canonical questions and wherein the second circle protocol comprises a second set of canonical questions,
a first circle sub-protocol, wherein the circle sub-protocol is a child protocol of the first circle protocol, wherein the first circle sub-protocol comprises a third set of canonical questions including at least a subset of the first set of canonical questions and optionally one or more additional canonical questions, the circles comprising:
a first circle associated with the first circle protocol and with a first group of one or more users, and
a second circle associated with the second circle protocol and with a second group of one or more users, wherein each of the circles is a construct configured to aggregate canonical answers in the canonical answer table that are responsive to a respective set of canonical questions of a respective protocol and derived from real world data received from one or more users in a respective group, and
wherein the circle processor is further configured to selectively provide a user associated with a given circle among the circles access to canonical answers in the canonical table according to the given circle that the user is associated with, a given protocol associated with the given circle and data sharing rules for one or more of the protocols in the hierarchy.

14. The system of claim 13, wherein the circle processor is configured to authorize users to enroll patient cases to one or more of the circles and record real-world data for the patient cases within the database in accordance with one or more protocols corresponding to the one or more circles.

15. The system of claim 13, wherein the circle processor is configured to:
authorize the given user associated with the given circle to enroll patient cases to the given circle and record real-world data for the enrolled patient cases according to the given circle protocol; and
wherein the circle processor is configured to build the canonical answer table based on the real-world data received from the given user, and wherein the canonical answer table is populated with canonical answers derived from the real-world data, and wherein each canonical answer populated to the canonical answer table is stored in association with the given user, the given circle, the given protocol and a corresponding canonical question.

16. The system of claim 13, wherein the circle sub-protocol is associated with a respective user, and wherein the respective user is in the first group of one or more users that is associated with the first circle.

17. The system of claim 13, further comprising:
a real-world data processor arranged to receive and analyze real-world data containing disparate and heterogeneous types of data and comprising real-world questions and corresponding real-world answers,
a canonical builder arranged to populate the canonical answer table with canonical answers from the real-world data, wherein the canonical builder builds the canonical answer table by:
for each real-world question and corresponding real-world answer, mapping the real-world question to a respective canonical question in the database, and populating a corresponding field in the canonical answer table using the corresponding real-world answer.

18. The system of claim 13, further comprising:
a real-world data processor arranged to,
receive a plain language question from the user via a computing device, and
convert the plain language question to a canonical question; and
wherein the circle processor is further configured to,
search the relational canonical database based on the canonical question,
retrieve, according to the data sharing rules, one or more canonical answers that correspond to the canonical question, and
send, to the computing device for display, at least two of:
the retrieved one or more canonical answers,
the plain language question, and
the real-world data corresponding to the retrieved one or more canonical answers.

19. The system of claim 13, the protocols including a root protocol comprising a superset of components of the circle protocols and any circle sub-protocols, wherein the root protocol comprises all canonical questions of the circle protocols and the circle sub-protocol, and wherein canonical answers to any canonical question of the circle protocols or circle sub-protocol are automatically associated with the root protocol.

20. The system of claim 13, wherein the circle processor is configured to provide a user associated with a given circle among the circles access to canonical answers in the canonical table according to the given circle that the user is associated with, a given protocol associated with the given circle and data sharing rules for one or more of the protocols in the hierarchy.

* * * * *